(12) United States Patent
Hall et al.

(10) Patent No.: US 12,233,900 B2
(45) Date of Patent: Feb. 25, 2025

(54) EDGE SYSTEM FOR PROVIDING LOCAL DYNAMIC MAP DATA

(71) Applicant: QUALCOMM Incorporated, San Diego, CA (US)

(72) Inventors: Edward Robert Hall, Bristol (GB); Alan Soloway, Erie, CO (US); Hong Cheng, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 384 days.

(21) Appl. No.: 17/016,924

(22) Filed: Sep. 10, 2020

(65) Prior Publication Data

US 2021/0101612 A1    Apr. 8, 2021

Related U.S. Application Data

(60) Provisional application No. 62/912,601, filed on Oct. 8, 2019.

(51) Int. Cl.
| | |
|---|---|
| *H04W 4/02* | (2018.01) |
| *B60W 60/00* | (2020.01) |
| *G06F 16/29* | (2019.01) |
| *G06F 16/9035* | (2019.01) |
| *H04W 4/40* | (2018.01) |

(52) U.S. Cl.
CPC ........... *B60W 60/001* (2020.02); *G06F 16/29* (2019.01); *G06F 16/9035* (2019.01); *H04W 4/025* (2013.01); *H04W 4/40* (2018.02); *B60W 2556/35* (2020.02); *B60W 2556/50* (2020.02)

(58) Field of Classification Search
None
See application file for complete search history.

(56) References Cited

U.S. PATENT DOCUMENTS

| | | | |
|---|---|---|---|
| 2015/0244805 A1* | 8/2015 | Hampiholi | ............. H04L 67/12 709/217 |
| 2017/0082987 A1* | 3/2017 | Reddy | .................... H04L 67/12 |
| 2017/0272450 A1 | 9/2017 | Krishnamurthi et al. | |
| 2018/0051998 A1 | 2/2018 | Stephens et al. | |

(Continued)

FOREIGN PATENT DOCUMENTS

| | | |
|---|---|---|
| CN | 104883382 A | 9/2015 |
| CN | 107449433 A | 12/2017 |
| CN | 109405841 A | 3/2019 |

OTHER PUBLICATIONS

International Search Report and Written Opinion—PCT/US2020/050426—ISA/EPO—Nov. 13, 2020. 17 pages.

(Continued)

*Primary Examiner* — Peter D Nolan
*Assistant Examiner* — Jacob Kent Besteman-Street
(74) *Attorney, Agent, or Firm* — Dinsmore & Shohl LLP

(57) ABSTRACT

Embodiments include methods performed by a processor of an Edge computing device for generating local dynamic map (LDM) data. The processor may receive new or updated ("first") LDM data for a service area of the Edge computing device. The processor may integrate the first LDM data into an LDM data model. The processor may determine second LDM data of the LDM data model that is relevant to a vehicle or mobile device. The processor may provide the determined second LDM data to the vehicle or mobile device.

19 Claims, 18 Drawing Sheets

(56) References Cited

U.S. PATENT DOCUMENTS

| | | | | |
|---|---|---|---|---|
| 2018/0299274 A1* | 10/2018 | Moghe | ............... | G01C 21/3896 |
| 2019/0132709 A1* | 5/2019 | Graefe | ................... | G05D 1/028 |
| 2019/0244517 A1* | 8/2019 | Moustafa | ........... | G01C 21/3881 |
| 2019/0373516 A1* | 12/2019 | Caldenhoven | ........ | H04W 36/12 |
| 2020/0245115 A1* | 7/2020 | Dorrance | ........... | G01C 21/3893 |
| 2021/0103481 A1* | 4/2021 | Bernat | .................. | G06F 9/4881 |

OTHER PUBLICATIONS

Jun Zhang, et al., "Mobile Edge Intelligence and Computing for the Internet of Vehicles", arxiv.org, Cornell University Library, 201 Olin Library Cornell University Ithaca, NY 14853, Jun. 2, 2019 (Jun. 2, 2019), XP081371904, pp. 1-18, the whole document.

\* cited by examiner

EDGE SYSTEM FOR PROVIDING LOCAL DYNAMIC MAP DATA

RELATED APPLICATIONS

This application claims the benefit of priority to U.S. Provisional Application No. 62/912,601 entitled "Edge System for Providing Local Dynamic Map Data" filed Oct. 8, 2019, the entire contents of which are hereby incorporated by reference for all purposes.

BACKGROUND

A local dynamic map (LDM) is a data model that is typically constructed by a mobile device. The mobile device obtains information about its environment from one or more sensors, and may receive other LDM data from other mobile devices (e.g., via a vehicle-to-everything (V2X) communications system) or from a network element such as a cloud-based server. The LDM data received from the mobile device sensors and from other mobile devices is limited by the perceptual limits of the mobile device's sensors and those of the other mobile devices. The LDM data received from distant network elements typically suffers from latency, and may not reflect highly dynamic environmental conditions. Further, the mobile device typically receives information about conditions and events far away and not relevant to the mobile device.

SUMMARY

Various aspects include methods performed by an Edge computing device for generating local dynamic map (LDM) data for mobile devices, such as autonomous and semi-autonomous vehicles.

Various aspects include methods performed by an Edge computing device for generating LDM data by receiving first LDM data for a service area of the Edge computing device, integrating the first LDM data into an LDM data model, determining second LDM data of the LDM data model that is relevant to a mobile device, and providing the determined second LDM data to the mobile device. In some aspects, the LDM data model may be maintained in the Edge computing device and includes LDM data of the service area of the Edge computing device.

In some aspects, the mobile device is a computing device in a vehicle. In such aspects, providing the determined second LDM data to the mobile device may include generating a digital map encompassing an area within a predetermined distance of the vehicle, and transmitting the digital map to the vehicle, in which the digital map may be generated and transmitted in a format suitable for use in autonomous navigation of the vehicle.

Some aspects may further include receiving a registration message from the mobile device, in which determining the second LDM data that is relevant to a mobile device may include determining the second LDM data that is relevant to a mobile device based on information included with the registration message.

Some aspects may further include receiving by the Edge computing device information regarding a planned route of the mobile device, in which determining the second LDM data that is relevant to a mobile device may include determining the second LDM data that is relevant to the mobile device along the planned route.

Some aspects may further include receiving mobile device kinematics information from the mobile device, in which determining the second LDM data that is relevant to a mobile device may include determining second LDM data that is relevant to a mobile device based on the mobile device kinematics information.

In some aspects, receiving first LDM data for a service area of the Edge computing device may include receiving data from the mobile device, in which the received data includes one or more of sensor data, image data, audio data, or operating state data obtained by the mobile device, and determining, from the received data, information that should be integrated into the LDM data model.

In some aspects, the first LDM data may include data that is highly dynamic information as defined in relevant European Telecommunications Standards Institute standards. In some aspects, the first LDM data may include data that was obtained from a sensor or another information source within a threshold amount of time. In some aspects, the threshold may be two seconds. In some aspects, the determined second LDM data may include highly dynamic LDM information as defined in relevant European Telecommunications Standards Institute standards. In some aspects, the first data may be received via an Edge network interface.

Some aspects may further include generating a state representation of the mobile device. In such aspects, determining the second LDM data that is relevant to the mobile device may include determining the second LDM data that is relevant to a mobile device based on the generated state representation of the mobile device. Such aspects may further include determining delta information based on the state representation and the second LDM data, and providing the determined delta information to the mobile device. Such aspects may further include receiving an LDM data query, and determining the second LDM data that is relevant to a mobile device based on the generated state representation of the mobile device and the received LDM data query.

Some aspects may further include determining a trust metric for the received first LDM data based on a plurality of trust parameters, and determining whether the trust metric exceeds a trust metric threshold. In such aspects, integrating the first LDM data into the LDM data model may include integrating the first LDM data into the LDM data model in response to determining that the trust metric exceeds the trust metric threshold.

Further aspects may include a mobile device having a processor configured to perform one or more operations of the methods summarized above. Further aspects may include a non-transitory processor-readable storage medium having stored thereon processor-executable instructions configured to cause a processor of a mobile device to perform operations of the methods summarized above. Further aspects include a mobile device having means for performing functions of the methods summarized above. Further aspects include a system on chip for use in a mobile device that includes a processor configured to perform one or more operations of the methods summarized above. Further aspects include a system in a package that includes two systems on chip for use in a mobile device that includes a processor configured to perform one or more operations of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1A:
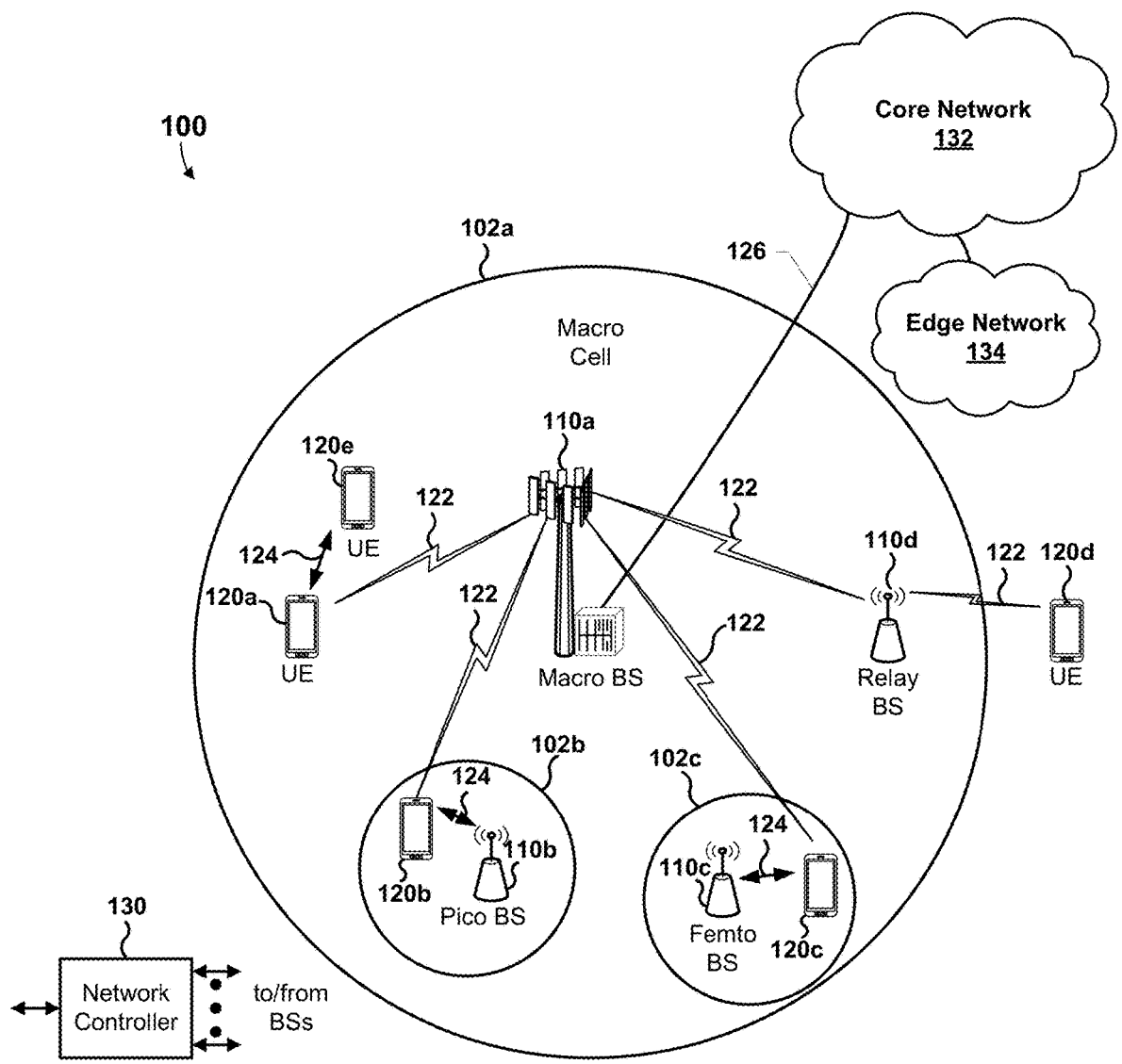
FIG. 1A is a system block diagram illustrating an example communications system suitable for use with various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

The term "mobile device" is used herein to refer to any one or all of wireless router devices, wireless appliances, cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (e.g., smart rings, smart bracelets, etc.), entertainment devices (e.g., wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, mobile devices affixed to or incorporated into various mobile platforms, global positioning system devices, and similar electronic devices that include a memory, wireless communication components and a programmable processor.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single mobile device. The proximity of the SOCs facilitates high speed communications and the sharing of memory and resources.

The term "multicore processor" may be used herein to refer to a single integrated circuit (IC) chip or chip package that contains two or more independent processing cores (e.g., CPU core, Internet protocol (IP) core, graphics processor unit (GPU) core, etc.) configured to read and execute program instructions. A SOC may include multiple multicore processors, and each processor in an SOC may be referred to as a core. The term "multiprocessor" may be used herein to refer to a system or device that includes two or more processing units configured to read and execute program instructions.

As used in this application, the terms "component," "system," "unit," "module," and the like include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a communication device and the communication device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

Conventionally, a vehicle or mobile device constructs an LDM using information obtained from one or more sensors (e.g., cameras, radar, LIDAR, etc.), from one or more other mobile devices or vehicles, and/or from remote data sources and network elements such as cloud-based servers. Processing this information and rendering the LDM data into a useable or presentable form, such as a digital map, requires numerous processor intensive operations.

The information used by a vehicle or mobile device is typically limited to data that can be stored in memory (e.g., static maps) and data from onboard sensors. LDM data received from onboard sensors and from other mobile devices is limited by the sensitivity, field of view and perceptual limits of each sensor. LDM data received from distant network elements typically does not include very recent changes in the environment near the vehicle of mobile device, and so may not reflect highly dynamic environmental conditions (e.g., road closures, construction, accidents, etc.).

LDM data may be structured in a variety of types reflecting a degree to which such information may change dynamically. For example, LDM data may be classified (for example, in relevant European Telecommunications Standards Institute (ETSI), standards) as: Type 1 for permanent static information, such as the locations of roads and geographic features; Type 2 for transient static information, such as speed limits; Type 3 for transient dynamic information, such as weather and traffic information; and Type 4 for highly dynamic information, such as locations of other vehicles in motion, pedestrians, parked vehicles, the state of traffic signals, and other highly transient conditions. In particular, LDM data from remote network elements does not include highly dynamic information (e.g., Type 4 information), because the collection, storage, organization and distribution of detailed transient conditions can be prohibitively complex and expensive. Additionally, vehicles and other mobile devices that rely on LDM data do not benefit from receiving information about conditions and events far away and therefore not relevant to operations, such as navigation. Thus, transmitting LDM data from remote data sources may unnecessarily increase the computational burden on the mobile device by requiring processing of irrelevant data.

Many of these shortcomings may be addressed by employing Edge computing resources to assemble, process and distribute LDM data to nearby vehicles/mobile devices. Edge computing is a distributed computing paradigm that positions network computing devices and data storage closer to devices such as mobile devices. Edge computing may be deployed to supplement processing capabilities of mobile devices by performing some processing tasks within the Edge computing devices and transmitting processed results to mobile devices. Edge computing systems may improve response times and save bandwidth as compared to more conventional cloud-based processing that is performed at more distant network locations from mobile devices.

Various embodiments provide methods and computing devices configured to gather, assemble and generate LDM data at an Edge computing device, and communicate the processed LDM data to nearby vehicles and mobile devices. Some embodiments leverage the greater computing power of Edge computing resources and the relative proximity of the Edge computing resources to vehicles and mobile devices to provide processed LDM data that includes highly dynamic information that is beyond the range of sensors onboard vehicles and mobile devices, but that is relevant to each vehicle and mobile device.

In various embodiments, an Edge computing device may receive new or updated (referred to as "first") LDM data for a service area of the Edge computing device. In some embodiments, the Edge computing device may receive the first LDM data from one or more data sources other than vehicles and mobile devices, such as other vehicles and mobile devices, roadside units (RSUs), data sources that may transmit Cooperative Awareness Message (CAM) messages or Decentralized Environmental Notification Message (DENM) messages, and a variety of Internet- or cloud-based resources. In some embodiments, the Edge computing device may receive the first LDM data via an Edge network interface. In some embodiments, the received first LDM data may be Type 4 information, or "highly dynamic" information, that reflects highly transient conditions. In some embodiments, the received LDM data may be obtained from a sensor or another information source within a threshold amount of time, such as two seconds, one second, 250 milliseconds, or another suitable threshold or window of time. In some embodiments, the first LDM data may include data gathered by sensors of vehicles and mobile devices and transmitted to the Edge computing device, such as sensor data, image data, audio data, or vehicle/device operating state data. In such embodiments, the Edge computing device may determine information received from vehicles and mobile devices that should be integrated into the LDM data model.

In some embodiments, the LDM data model represents an aggregation of LDM data for the service area of the Edge computing device. In some embodiments, the Edge computing device may determine second LDM data of the LDM data model that is relevant to particular vehicles and mobile devices, and may provide that determined second LDM data to the vehicles and mobile devices. In some embodiments, the LDM data that the Edge computing device determines is relevant to particular vehicles and mobile devices (i.e., the second LDM data) may be highly dynamic LDM information (e.g., as such information is defined in relevant ETSI standards).

In some embodiments, a mobile device may be a computing device in a vehicle, such as a navigation unit or vehicle control system of an autonomous vehicle or semi-autonomous vehicle. In some embodiments, providing the determined second LDM data to vehicles and mobile devices may include generating a digital map encompassing an area within a predetermined distance of each vehicle, and transmitting the generated, vehicle-specific digital map to the vehicle. In such embodiments, the digital map may be generated and transmitted in a format suitable for use by the vehicle computing device for autonomous navigation.

In some embodiments, the Edge computing device may receive a registration message from vehicles and mobile devices. The registration message may register a vehicle or mobile device to receive LDM data as a service from the Edge application server. In some embodiments, the Edge computing device may receive from the mobile device information that is included in or with the registration message, such as information regarding the location of the mobile device, information regarding a planned route of the mobile device, information about kinematics of the mobile device, and other information from the mobile device. In some embodiments, the Edge computing device may use any of such information to determine second LDM data that is relevant to each of the vehicles and mobile devices. In various embodiments, the Edge computing device may provide the second LDM data to each of the vehicles and mobile devices over an Edge network interface.

Various embodiments improve the operation of vehicles and mobile devices by leveraging Edge computing resources to aggregate and process LDM data local to a surface area of the Edge computing device and to provide that aggregated and processed LDM data to vehicles and mobile devices. Various embodiments improve the operation of vehicles and mobile devices by leveraging Edge computing resources to determine LDM data that is relevant to particular vehicles and mobile devices and provide that relevant LDM data to the corresponding vehicle or mobile device. Various embodiments may provide LDM data to vehicles and mobile devices that may otherwise be unavailable to the vehicles and mobile devices, thereby improving the accuracy of applications and systems that use the LDM data. Various embodiments reduce a processing burden on vehicles and mobile devices associated with processing the LDM data, which may be highly resource intensive.

FIG. 1A illustrates an example of a communications system 100 that is suitable for implementing various embodiments. The communications system 100 may be an 5G NR network, or any other suitable communication network (e.g., 4G LTE, 3G, etc.).

The communications system 100 may include a heterogeneous network architecture that includes a core network 132 and a variety of mobile devices (illustrated as mobile devices 120a-120e in FIG. 1). The communications system 100 may include an Edge network 134 provide network computing resources in proximity to the mobile devices. The communications system 100 may also include a number of base stations (illustrated as the BS 110a, the BS 110b, the BS 110c, and the BS 110d) and other network entities. A base station is an entity that communicates with mobile devices (mobile devices), and also may be referred to as an NodeB, a Node B, an LTE evolved nodeB (eNB), an access point (AP), a radio head, a transmit receive point (TRP), a New Radio base station (NR BS), a 5G NodeB (NB), a Next Generation NodeB (gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by mobile devices with service subscription. A pico cell may cover a relatively small geographic area and may allow unrestricted access by mobile devices with service subscription. A femto cell may cover a relatively small geographic area (for example, a home) and may allow restricted access by mobile devices having association with the femto cell (for example, mobile devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network The base station 110a-110d may communicate with the core network 132 over a wired or wireless communication link 126. The mobile device 120a-120e may communicate with the base station 110a-110d over a wireless communication link 122.

The wired communication link 126 may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (e.g., relay BS 110d). A relay station is an entity that can receive a transmission of data from an upstream station (for example, a base station or a mobile device) and send a transmission of the data to a downstream station (for example, a mobile device or a base station). A relay station also may be a mobile device that can relay transmissions for other mobile devices. In the example illustrated in FIG. 1, a relay station 110d may communicate with macro the base station 110a and the mobile device 120d in order to facilitate communication between the base station 110a and the mobile device 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The mobile devices 120a, 120b, 120c may be dispersed throughout communications system 100, and each mobile device may be stationary or mobile. A mobile device also may be referred to as an access terminal, a terminal, a mobile station, a subscriber unit, a station, etc.

A macro base station 110a may communicate with the communication network 132 over a wired or wireless communication link 126. The mobile devices 120a, 120b, 120c may communicate with a base station 110a-110d over a wireless communication link 122.

The wireless communication links 122, 124 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (e.g., NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links 122, 124 within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some embodiments may use terminology and examples associated with LTE technologies, various embodiments may be applicable to other wireless communications systems, such as a new radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding may also be supported. MIMO configurations in the DL may support up to eight transmit antennas with multi-layer DL transmissions up to eight streams and up to two streams per mobile device. Multi-layer transmissions with up to 2 streams per mobile device may be supported. Aggregation of multiple cells may be supported with up to eight serving cells. Alternatively, NR may support a different air interface, other than an OFDM-based air interface.

Some mobile devices may be considered machine-type communication (MTC) or evolved or enhanced machine-type communication (eMTC) mobile devices. MTC and eMTC mobile devices include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some mobile devices may be considered Internet-of-Things (IoT) devices or may be implemented as NB-IoT (narrowband internet of things) devices. A mobile device 120a-e may be included inside a housing that houses components of the mobile device, such as processor components, memory components, similar components, or a combination thereof.

In general, any number of communications systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, NR or 5G RAT networks may be deployed.

In some implementations, two or more mobile devices 120a-e (for example, illustrated as the mobile device 120a and the mobile device 120e) may communicate directly using one or more sidelink channels 124 (for example, without using a base station 110 as an intermediary to communicate with one another). For example, the mobile devices 120a-e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the mobile device 120a-e may perform scheduling operations, resource selection operations, as well as other operations described elsewhere herein as being performed by the base station 110a.

Figure 1B:
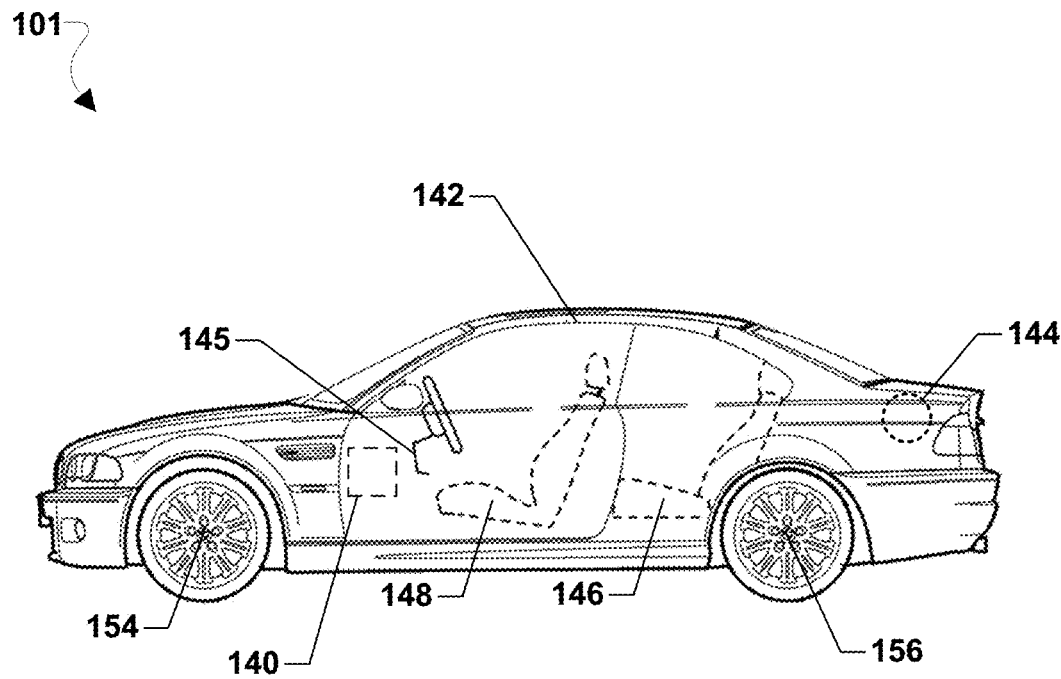
FIGS. 1B and 1C are component block diagrams illustrating a vehicle suitable for implementing various embodiments.
Figure 1C:
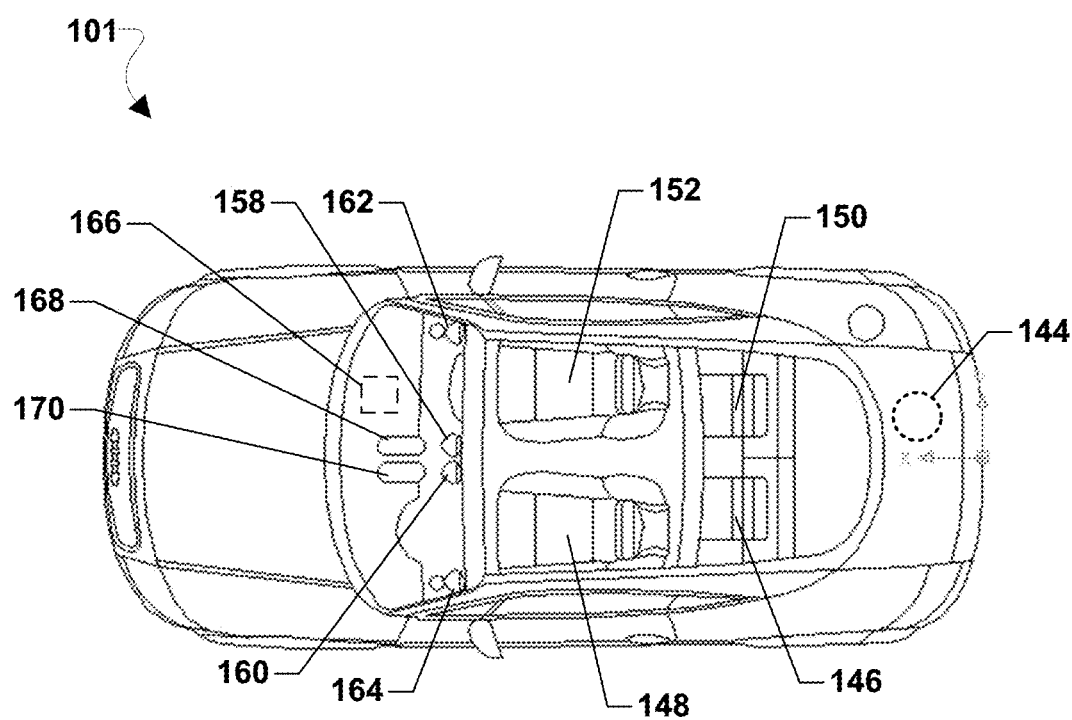

Various embodiments may be implemented within a variety of vehicles, an example vehicle 101 of which is illustrated in FIGS. 1A and 1B. With reference to FIGS. 1A and 1B, a vehicle 101 may include a control unit 140 and a plurality of sensors 144-170, including satellite geopositioning system receivers 142, occupancy sensors 144, 146, 148, 150, 152, tire pressure sensors 154, 156, cameras 158, 160, microphones 162, 164, impact sensors 166, radar 168, and lidar 170. The plurality of sensors 144-170, disposed in or on the vehicle, may be used for various purposes, such as autonomous and semi-autonomous navigation and control, crash avoidance, position determination, etc., as well to provide sensor data regarding objects and people in or on the vehicle 101. The sensors 144-170 may include one or more of a wide variety of sensors capable of detecting a variety of information useful for navigation and collision avoidance. Each of the sensors 144-170 may be in wired or wireless communication with a control unit 140, as well as with each other. In particular, the sensors may include one or more cameras 158, 160 or other optical sensors or photo optic sensors. The sensors may further include other types of object detection and ranging sensors, such as radar 168, lidar 170, IR sensors, and ultrasonic sensors. The sensors may further include tire pressure sensors 154, 156, humidity sensors, temperature sensors, satellite geopositioning sensors 142, control input sensors 145, accelerometers, vibration sensors, gyroscopes, gravimeters, impact sensors 166, force meters, stress meters, strain sensors, fluid sensors, chemical sensors, gas content analyzers, pH sensors, radiation sensors, Geiger counters, neutron detectors, biological material sensors, microphones 162, 164, occupancy sensors 144, 146, 148, 150, 152, proximity sensors, and other sensors.

The vehicle control unit 140 may be configured with processor-executable instructions to perform navigation and collision avoidance operations using information received from various sensors, particularly the cameras 158, 160. In some embodiments, the control unit 140 may supplement the processing of camera images using distance and relative position (e.g., relative bearing angle) that may be obtained from radar 168 and/or lidar 170 sensors. The control unit 140 may further be configured to control steering, breaking and speed of the vehicle 101 when operating in an autonomous or semi-autonomous mode using information regarding other vehicles determined using various embodiments.

Figure 1D:
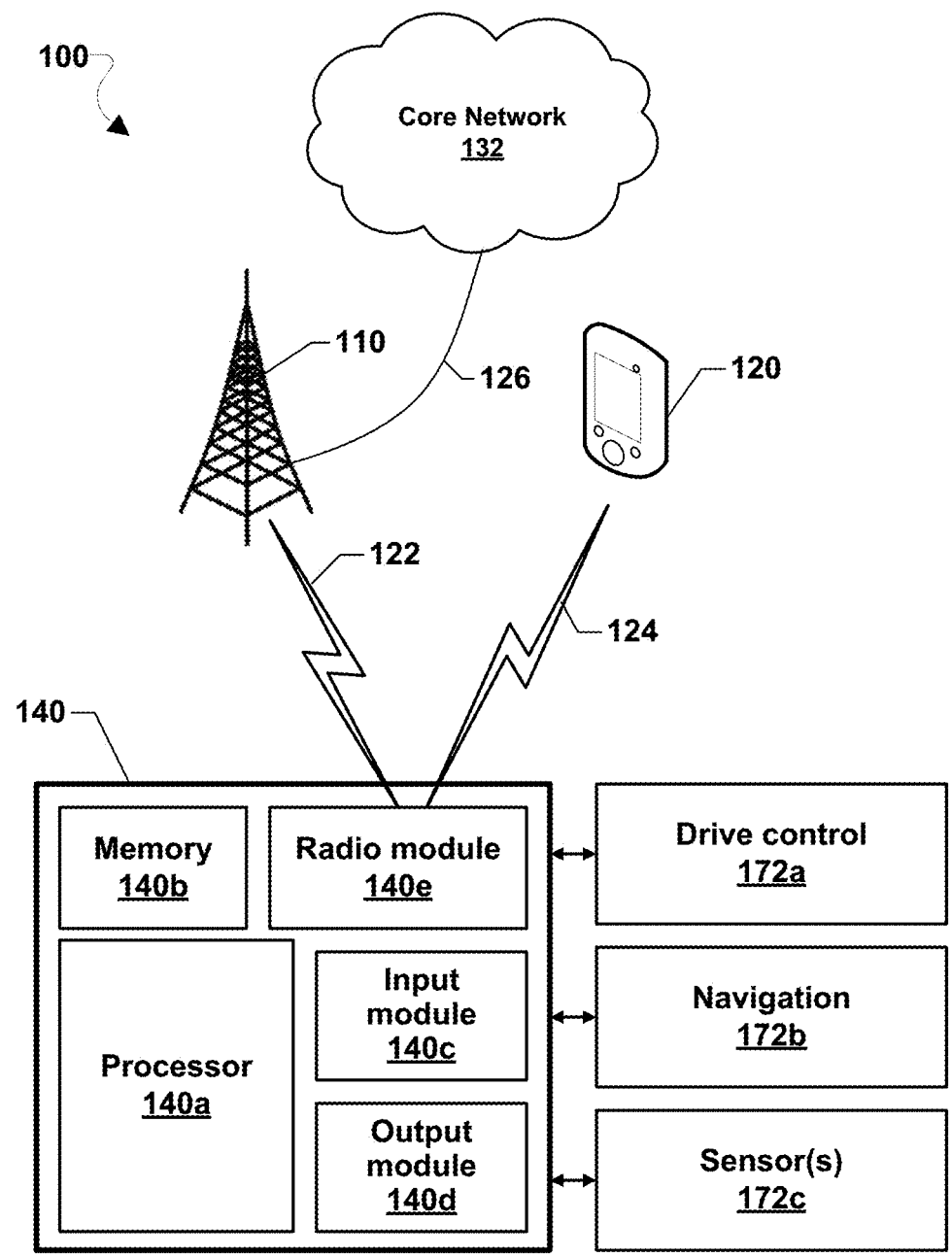
FIG. 1D is a component block diagram illustrating components of a vehicle suitable for implementing various embodiments.

FIG. 1D is a component block diagram illustrating a communication system 100 of components and support systems suitable for implementing various embodiments. With reference to FIGS. 1A-1D, a vehicle 101 may include a control unit 140, which may include various circuits and devices used to control the operation of the vehicle 101. In the example illustrated in FIG. 1D the control unit 140 includes a processor 140a, memory 140b, an input module 140c, an output module 140d and a radio module 140e. The control unit 140 may be coupled to and configured to control drive control components 172a, navigation components 172b, and one or more sensors 172c of the vehicle 101. The processor 140a that may be configured with processor-executable instructions to control maneuvering, navigation, and/or other operations of the vehicle 101, including operations of various embodiments. The processor 140a may be coupled to the memory 140b.

The radio module 140e may be configured for wireless communication. The radio module 140e may exchange signals (e.g., command signals for controlling maneuvering, signals from navigation facilities, etc.) via the communication link 122 with a network transceiver (e.g., the base station 110), and may provide the signals to the processor 140a and/or the navigation unit 172b. In some embodiments, the radio module 140e may enable the vehicle 101 to communicate with a wireless communication device 120 through the wireless communication link 124. The wireless communication link 124 may be a bidirectional or unidirectional communication link, and may use one or more communication protocols, as described.

The input module 140c may receive sensor data from one or more vehicle sensors 172c as well as electronic signals from other components, including the drive control components 172a and the navigation components 172b. The output module 140d may communicate with or activate various components of the vehicle 101, including the drive control components 172a, the navigation components 172b, and the sensor(s) 172c.

The control unit 140 may be coupled to the drive control components 172a to control physical elements of the vehicle 101 related to maneuvering and navigation of the vehicle, such as the engine, motors, throttles, steering elements, flight control elements, braking or deceleration elements, and the like. The drive control components 172a may also include components that control other devices of the vehicle, including environmental controls (e.g., air conditioning and heating), external and/or interior lighting, interior and/or exterior informational displays (which may include a display screen or other devices to display information), safety devices (e.g., haptic devices, audible alarms, etc.), and other similar devices.

The control unit 140 may be coupled to the navigation components 172b, and may receive data from the navigation components 172b and be configured to use such data to determine the present position and orientation of the vehicle 101, as well as an appropriate course toward a destination. The navigation components 172b may include or be coupled to a global navigation satellite system (GNSS) receiver system (e.g., one or more Global Positioning System (GPS) receivers) enabling the vehicle 101 to determine its current position using GNSS signals. Alternatively, or in addition, the navigation components 172b may include radio navigation receivers for receiving navigation beacons or other signals from radio nodes, such as Wi-Fi access points, cellular network sites, radio station, remote computing devices, other vehicles, etc. Through control of the drive control elements 172a, the processor 140a may control the vehicle 101 to navigate and maneuver. The processor 140a and/or the navigation components 172b may be configured to communicate with a network element such as a server in a communication network (e.g., the core network 132) via the wireless communication link 122 to receive commands to control maneuvering, receive data useful in navigation, provide real-time position reports, and assess other data.

The control unit 140 may be coupled to one or more sensors 172c. The sensor(s) 172c may include the sensors 144-170 as described, and may the configured to provide a variety of data to the processor 140a.

While the control unit 140 is described as including separate components, in some embodiments some or all of the components (e.g., the processor 140a, the memory 140b, the input module 140c, the output module 140d, and the radio module 140e) may be integrated in a single device or module, such as a system-on-chip (SOC) processing device. Such an SOC processing device may be configured for use in vehicles and be configured, such as with processor-executable instructions executing in the processor 140a, to perform operations of navigation and collision avoidance using LDM data when installed in a vehicle.

Figure 1E:
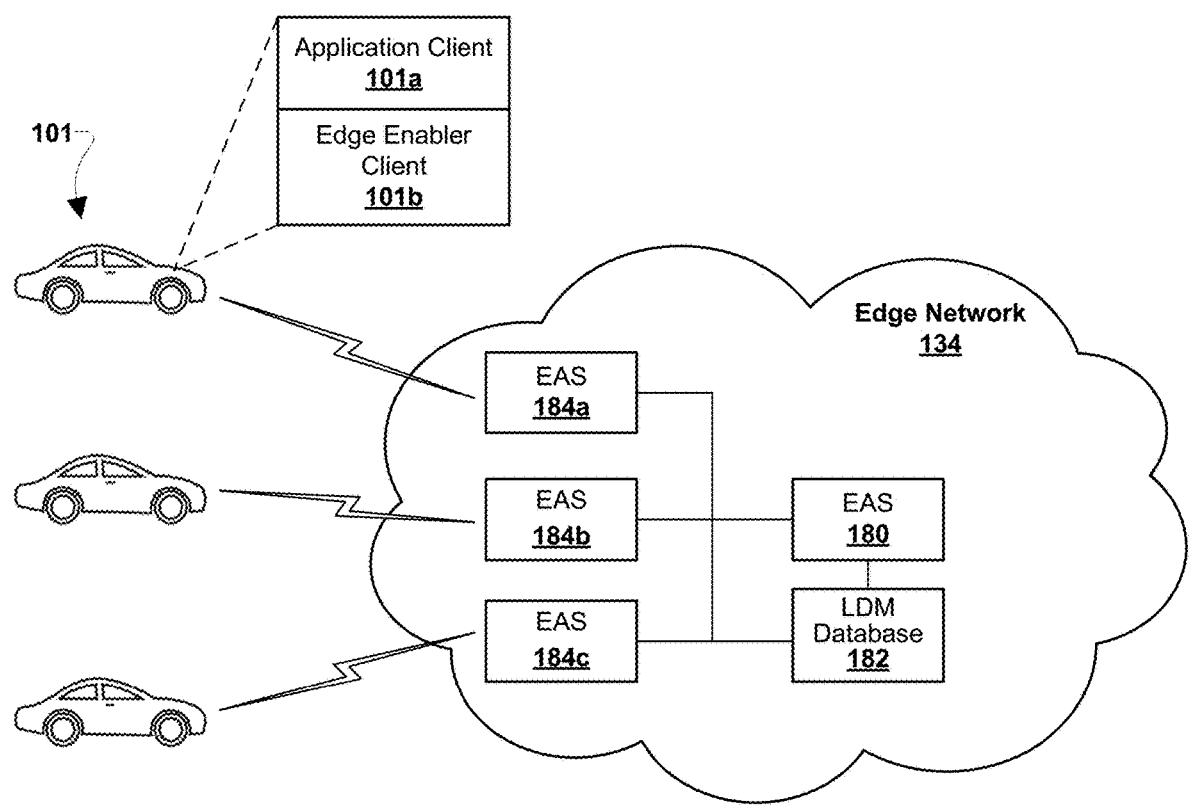
FIG. 1E is a system block diagram illustrating aspects of the Edge network suitable for implementing various embodiments.

FIG. 1E is a system block diagram illustrating aspects of the Edge network 134 suitable for implementing various embodiments. In some embodiments, each vehicle 101 (or any other mobile device) may be configured with an application client 101a and an Edge enabler client 101b. In some embodiments, the application client 101a and an Edge enabler client 101b may communicate with an Edge Enabler Server (EAS) 184a-184c via a wireless communication link. Each of the Edge Enabler Servers 184a-184c may communicate with an Edge Enabler Server 180 via a wired or wireless communication link. The Edge Enabler Server 180 may communicate with an LDM database 182. Each of the Edge Enabler Servers 184a-184c may also communicate with the LDM database 182 directly. Aspects of the various wired and wireless communication links are described above with respect to FIG. 1A. In some embodiments, each EAS 184a-184c and 180 may execute on one or more computing devices, such as network servers or another suitable computing device.

In various embodiments, the LDM database 182 may store LDM data and/or an LDM data model. The EAS 180 may maintain, update, add, and delete information from the LDM database 182. In some embodiments, the EAS 180 may receive new or updated LDM data from a vehicle 101 via an EAS 184a-184c for an Edge service area and may integrate the LDM data into the LDM data model. In some embodiments, the EAS 180 may execute one or more authentication or security functions to verify the LDM data before the data is included or integrated into the LDM data model in the LDM database 182.

In some embodiments, an EAS 184a-184c may execute on a computing device for each vehicle 101. In some embodiments, the EAS 184a-184c may determine a subset of LDM data to provide to the associated vehicle 101, and then provide the determined subset of LDM data to the vehicle 101. In some embodiments, the EAS 184a-184c may query the EAS 180 and/or the LDM database 182 for suitable LDM information for the vehicle 101. In some embodiments, the EAS 184a-184c associated with a vehicle 101 may generate a vehicle state representation for the associated vehicle 101. In some embodiments, the vehicle state representation may include information about the associated vehicle such as a location, a direction of motion, a velocity, an occupancy, a status (e.g., an operational status, such as "on", "parked", "in motion", etc.), size, dimension, and/or volume information about the vehicle, and other vehicle-descriptive information. Some embodiments may also be applied to other mobile devices (e.g., beyond vehicles), for which the EAS 184a-184c may determine and maintain an applicable state representation (e.g., including parameters applicable to the particular mobile device). In some embodiments, the EAS 184a-184c may use the vehicle state representation to determine relevant LDM information to provide to the vehicle 101. In some embodiments, the EAS 184a-184c may provide the vehicle state representation to the EAS 180 to enable the EAS 180 to determine relevant LDM information to provide to the vehicle 101. In some embodiments, the vehicle state representation may also include a current LDM subset stored by or used by the associated vehicle 101.

Figure 2A:
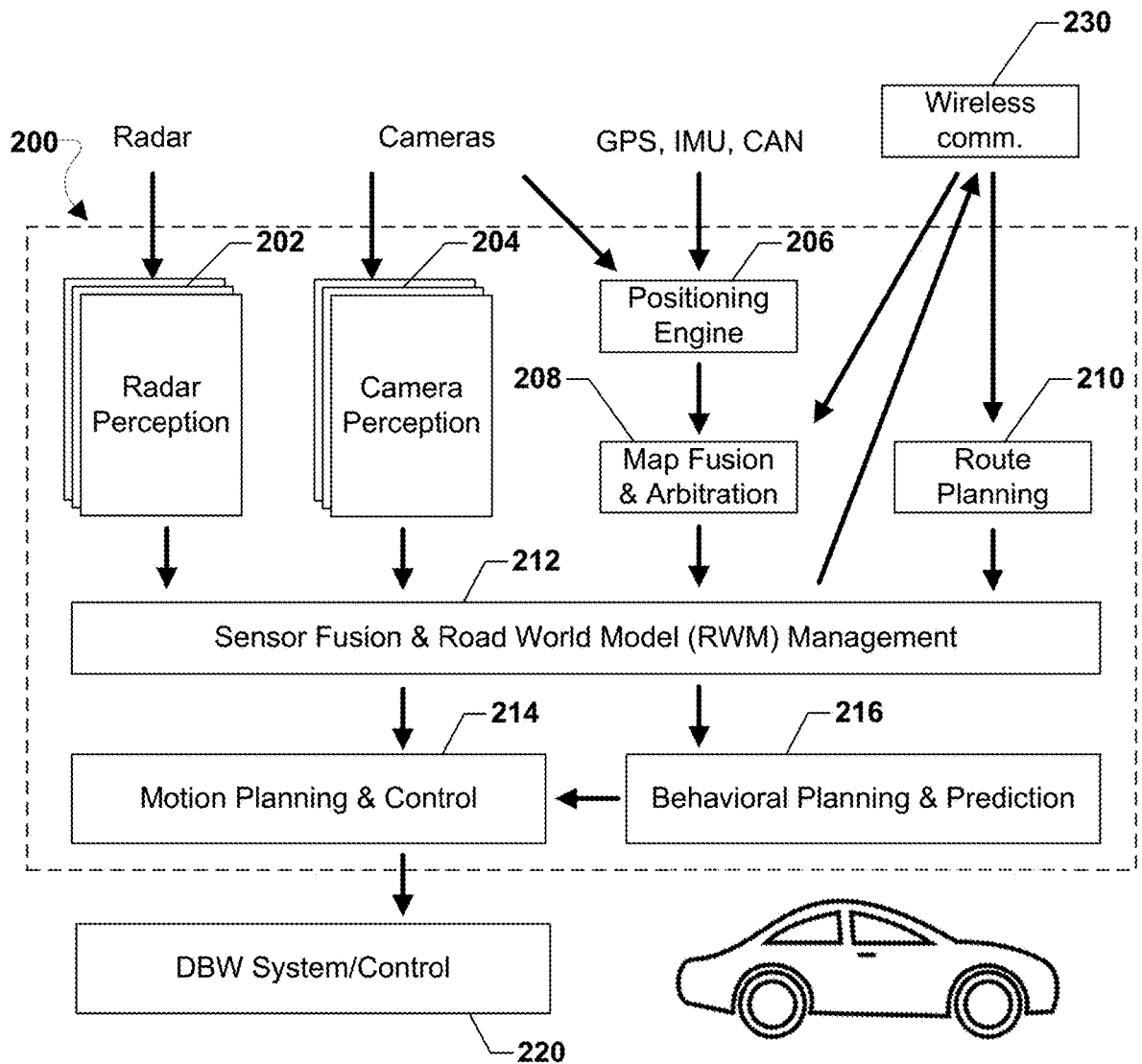
FIG. 2A is a component block diagram illustrating components of an example vehicle management system according to various embodiments.

FIG. 2A is a component block diagram illustrating components of an example vehicle management system 200. The vehicle management system 200 may include various subsystems, communication elements, computational elements, computing devices or units which may be utilized within a vehicle 101. With reference to FIGS. 1A-2A, the various computational elements, computing devices or units within vehicle management system 200 may be implemented within a system of interconnected computing devices (i.e., subsystems), that communicate data and commands to each other (e.g., indicated by the arrows in FIG. 2A). In some implementations, the various computational elements, computing devices or units within vehicle management system 200 may be implemented within a single computing device, such as separate threads, processes, algorithms or computational elements. Therefore, each subsystem/computational element illustrated in FIG. 2A is also generally referred to herein as "layer" within a computational "stack" that constitutes the vehicle management system 200. However, the use of the terms layer and stack in describing various embodiments are not intended to imply or require that the corresponding functionality is implemented within a single autonomous (or semi-autonomous) vehicle management system computing device, although that is a potential implementation embodiment. Rather the use of the term "layer" is intended to encompass subsystems with independent processors, computational elements (e.g., threads, algorithms, subroutines, etc.) running in one or more computing devices, and combinations of subsystems and computational elements.

The vehicle management system stack may include a radar perception layer 202, a camera perception layer 204, a positioning engine layer 206, a map fusion and arbitration layer 208, a route planning layer 210, sensor fusion and road world model (RWM) management layer 212, motion planning and control layer 214, and behavioral planning and prediction layer 216. The layers 202-216 are merely examples of some layers in one example configuration of the vehicle management system stack 200. In other configurations, other layers may be included, such as additional layers for other perception sensors (e.g., LIDAR perception layer, etc.), additional layers for planning and/or control, additional layers for modeling, etc., and/or certain of the layers 202-216 may be excluded from the vehicle management system stack 200. Each of the layers 202-216 may exchange data, computational results and commands as illustrated by the arrows in FIG. 2A. Further, the vehicle management system stack 200 may receive and process data from sensors (e.g., radar, lidar, cameras, inertial measurement units (IMU) etc.), navigation systems (e.g., GPS receivers, IMUs, etc.), vehicle networks (e.g., Controller Area Network (CAN) bus), and databases in memory (e.g., digital map data). The vehicle management system stack 200 may output vehicle control commands or signals to the drive by wire (DBW) system/control unit 220, which is a system, subsystem or computing device that interfaces directly with vehicle steering, throttle and brake controls. The configuration of the vehicle management system stack 200 and DBW system/control unit 220 illustrated in FIG. 2A is merely an example configuration and other configurations of a vehicle management system and other vehicle components may be used. As an example, the configuration of the vehicle management system stack 200 and DBW system/control unit 220 illustrated in FIG. 2A may be used in a vehicle configured for autonomous or semi-autonomous operation while a different configuration may be used in a non-autonomous vehicle.

The radar perception layer 202 may receive data from one or more detection and ranging sensors, such as radar (e.g., 132) and/or lidar (e.g., 138), and process the data to recognize and determine locations of other vehicles and objects within a vicinity of the vehicle 100. The radar perception layer 202 may include use of neural network processing and artificial intelligence methods to recognize objects and vehicles, and pass such information on to the sensor fusion and RWM management layer 212.

The camera perception layer 204 may receive data from one or more cameras, such as cameras (e.g., 122, 136), and process the data to recognize and determine locations of other vehicles and objects within a vicinity of the vehicle 100. The camera perception layer 204 may include use of neural network processing and artificial intelligence methods to recognize objects and vehicles, and pass such information on to the sensor fusion and RWM management layer 212.

The positioning engine layer 206 may receive data from various sensors and process the data to determine a position of the vehicle 100. The various sensors may include, but is not limited to, GPS sensor, an IMU, and/or other sensors connected via a CAN bus. The positioning engine layer 206 may also utilize inputs from one or more cameras, such as cameras (e.g., 122, 136) and/or any other available sensor, such as radars, LIDARs, etc.

The vehicle management system 200 may include or be coupled to a vehicle wireless communication subsystem 230. The wireless communication subsystem 230 may be configured to communicate with other vehicle computing devices and highway communication systems, such as via vehicle-to-vehicle (V2V) communication links and/or to remote information sources, such as cloud-based resources, via cellular wireless communication systems, such as 5G networks. In various embodiments, the wireless communication subsystem 230 may communicate with Edge computing devices via wireless communication links to receive LDM data.

The map fusion and arbitration layer 208 may access LDM data received from Edge computing devices and receive output received from the positioning engine layer 206 and process the data to further determine the position of the vehicle 101 within the map, such as location within a lane of traffic, position within a street map, etc. LDM data may be stored in a memory (e.g., memory 166). For example, the map fusion and arbitration layer 208 may convert latitude and longitude information from GPS into locations within a surface map of roads contained in the LDM data. GPS position fixes include errors, so the map fusion and arbitration layer 208 may function to determine a best guess location of the vehicle within a roadway based upon an arbitration between the GPS coordinates and the LDM data. For example, while GPS coordinates may place the vehicle near the middle of a two-lane road in the LDM data, the map fusion and arbitration layer 208 may determine from the direction of travel that the vehicle is most likely aligned with the travel lane consistent with the direction of travel. The map fusion and arbitration layer 208 may pass map-based location information to the sensor fusion and RWM management layer 212.

The route planning layer 210 may utilize LDM data, as well as inputs from an operator or dispatcher to plan a route to be followed by the vehicle 101 to a particular destination. The route planning layer 210 may pass map-based location information to the sensor fusion and RWM management layer 212. However, the use of a prior map by other layers, such as the sensor fusion and RWM management layer 212, etc., is not required. For example, other stacks may operate and/or control the vehicle based on perceptual data alone without a provided map, constructing lanes, boundaries, and the notion of a local map as perceptual data is received.

The sensor fusion and RWM management layer 212 may receive data and outputs produced by the radar perception layer 202, camera perception layer 204, map fusion and arbitration layer 208, and route planning layer 210, and use some or all of such inputs to estimate or refine the location and state of the vehicle 101 in relation to the road, other vehicles on the road, and other objects within a vicinity of the vehicle 100. For example, the sensor fusion and RWM management layer 212 may combine imagery data from the camera perception layer 204 with arbitrated map location information from the map fusion and arbitration layer 208 to refine the determined position of the vehicle within a lane of traffic. As another example, the sensor fusion and RWM management layer 212 may combine object recognition and imagery data from the camera perception layer 204 with object detection and ranging data from the radar perception layer 202 to determine and refine the relative position of other vehicles and objects in the vicinity of the vehicle. As another example, the sensor fusion and RWM management layer 212 may receive information from vehicle-to-vehicle (V2V) communications (such as via the CAN bus) regarding other vehicle positions and directions of travel, and combine that information with information from the radar perception layer 202 and the camera perception layer 204 to refine the locations and motions of other vehicles. The sensor fusion and RWM management layer 212 may output refined location and state information of the vehicle 100, as well as refined location and state information of other vehicles and objects in the vicinity of the vehicle, to the motion planning and control layer 214 and/or the behavior planning and prediction layer 216.

As a further example, the sensor fusion and RWM management layer 212 may use dynamic traffic control instructions directing the vehicle 101 to change speed, lane, direction of travel, or other navigational element(s), and combine that information with other received information to determine refined location and state information. The sensor fusion and RWM management layer 212 may output the refined location and state information of the vehicle 100, as well as refined location and state information of other vehicles and objects in the vicinity of the vehicle 100, to the motion planning and control layer 214, the behavior planning and prediction layer 216 and/or devices remote from the vehicle 100, such as a data server, other vehicles, etc., via wireless communications, such as through C-V2X connections, other wireless connections, etc.

As a still further example, the sensor fusion and RWM management layer 212 may monitor perception data from various sensors, such as perception data from a radar perception layer 202, camera perception layer 204, other perception layer, etc., and/or data from one or more sensors themselves to analyze conditions in the vehicle sensor data. The sensor fusion and RWM management layer 212 may be configured to detect conditions in the sensor data, such as sensor measurements being at, above, or below a threshold, certain types of sensor measurements occurring, etc., and may output the sensor data as part of the refined location and state information of the vehicle 101 provided to the behavior planning and prediction layer 216 and/or devices remote from the vehicle 100, such as a data server, other vehicles, etc., via wireless communications, such as through C-V2X connections, other wireless connections, etc.

The refined location and state information may include vehicle descriptors associated with the vehicle and the vehicle owner and/or operator, such as: vehicle specifications (e.g., size, weight, color, on board sensor types, etc.); vehicle position, speed, acceleration, direction of travel, attitude, orientation, destination, fuel/power level(s), and other state information; vehicle emergency status (e.g., is the vehicle an emergency vehicle or private individual in an emergency); vehicle restrictions (e.g., heavy/wide load, turning restrictions, high occupancy vehicle (HOV) authorization, etc.); capabilities (e.g., all-wheel drive, four-wheel drive, snow tires, chains, connection types supported, on board sensor operating statuses, on board sensor resolution levels, etc.) of the vehicle; equipment problems (e.g., low tire pressure, weak breaks, sensor outages, etc.); owner/operator travel preferences (e.g., preferred lane, roads, routes, and/or destinations, preference to avoid tolls or highways, preference for the fastest route, etc.); permissions to provide sensor data to a data agency server (e.g., 184); and/or owner/operator identification information.

The behavioral planning and prediction layer 216 of the autonomous vehicle system stack 200 may use the refined location and state information of the vehicle 101 and location and state information of other vehicles and objects output from the sensor fusion and RWM management layer 212 to predict future behaviors of other vehicles and/or objects. For example, the behavioral planning and prediction layer 216 may use such information to predict future relative positions of other vehicles in the vicinity of the vehicle based on own vehicle position and velocity and other vehicle positions and velocity. Such predictions may take into account information from the LDM data and route planning to anticipate changes in relative vehicle positions as host and other vehicles follow the roadway. The behavioral planning and prediction layer 216 may output other vehicle and object behavior and location predictions to the motion planning and control layer 214. Additionally, the behavior planning and prediction layer 216 may use object behavior in combination with location predictions to plan and generate control signals for controlling the motion of the vehicle 100. For example, based on route planning information, refined location in the roadway information, and relative locations and motions of other vehicles, the behavior planning and prediction layer 216 may determine that the vehicle 101 needs to change lanes and accelerate, such as to maintain or achieve minimum spacing from other vehicles, and/or prepare for a turn or exit. As a result, the behavior planning and prediction layer 216 may calculate or otherwise determine a steering angle for the wheels and a change to the throttle setting to be commanded to the motion planning and control layer 214 and DBW system/control unit 220 along with such various parameters necessary to effectuate such a lane change and acceleration. One such parameter may be a computed steering wheel command angle.

The motion planning and control layer 214 may receive data and information outputs from the sensor fusion and RWM management layer 212 and other vehicle and object behavior as well as location predictions from the behavior planning and prediction layer 216, and use this information to plan and generate control signals for controlling the motion of the vehicle 101 and to verify that such control signals meet safety requirements for the vehicle 100. For example, based on route planning information, refined location in the roadway information, and relative locations and motions of other vehicles, the motion planning and control layer 214 may verify and pass various control commands or instructions to the DBW system/control unit 220.

The DBW system/control unit 220 may receive the commands or instructions from the motion planning and control layer 214 and translate such information into mechanical control signals for controlling wheel angle, brake and throttle of the vehicle 100. For example, DBW system/control unit 220 may respond to the computed steering wheel command angle by sending corresponding control signals to the steering wheel controller.

In various embodiments, the wireless communication subsystem 230 may communicate with Edge computing devices via wireless communication links to transmit sensor data, position data, vehicle data and data gathered about the environment around the vehicle by onboard sensors. Such information may be used by Edge computing devices to update LDM data for relay to vehicles within the local area of each Edge computing device.

In various embodiments, the vehicle management system stack 200 may include functionality that performs safety checks or oversight of various commands, planning or other decisions of various layers that could impact vehicle and occupant safety. Such safety check or oversight functionality may be implemented within a dedicated layer or distributed among various layers and included as part of the functionality. In some embodiments, a variety of safety parameters may be stored in memory and the safety checks or oversight functionality may compare a determined value (e.g., relative spacing to a nearby vehicle, distance from the roadway centerline, etc.) to corresponding safety parameter(s), and issue a warning or command if the safety parameter is or will be violated. For example, a safety or oversight function in the behavior planning and prediction layer 216 (or in a separate layer) may determine the current or future separate distance between another vehicle (as defined by the sensor fusion and RWM management layer 212) and the vehicle (e.g., based on the world model refined by the sensor fusion and RWM management layer 212), compare that separation distance to a safe separation distance parameter stored in memory, and issue instructions to the motion planning and control layer 214 to speed up, slow down or turn if the current or predicted separation distance violates the safe separation distance parameter. As another example, safety or oversight functionality in the motion planning and control layer 214 (or a separate layer) may compare a determined or commanded steering wheel command angle to a safe wheel angle limit or parameter, and issue an override command and/or alarm in response to the commanded angle exceeding the safe wheel angle limit.

Some safety parameters stored in memory may be static (i.e., unchanging over time), such as maximum vehicle speed. Other safety parameters stored in memory may be dynamic in that the parameters are determined or updated continuously or periodically based on vehicle state information and/or environmental conditions. Non-limiting examples of safety parameters include maximum safe speed, maximum brake pressure, maximum acceleration, and the safe wheel angle limit, all of which may be a function of roadway and weather conditions.

Figure 2B:
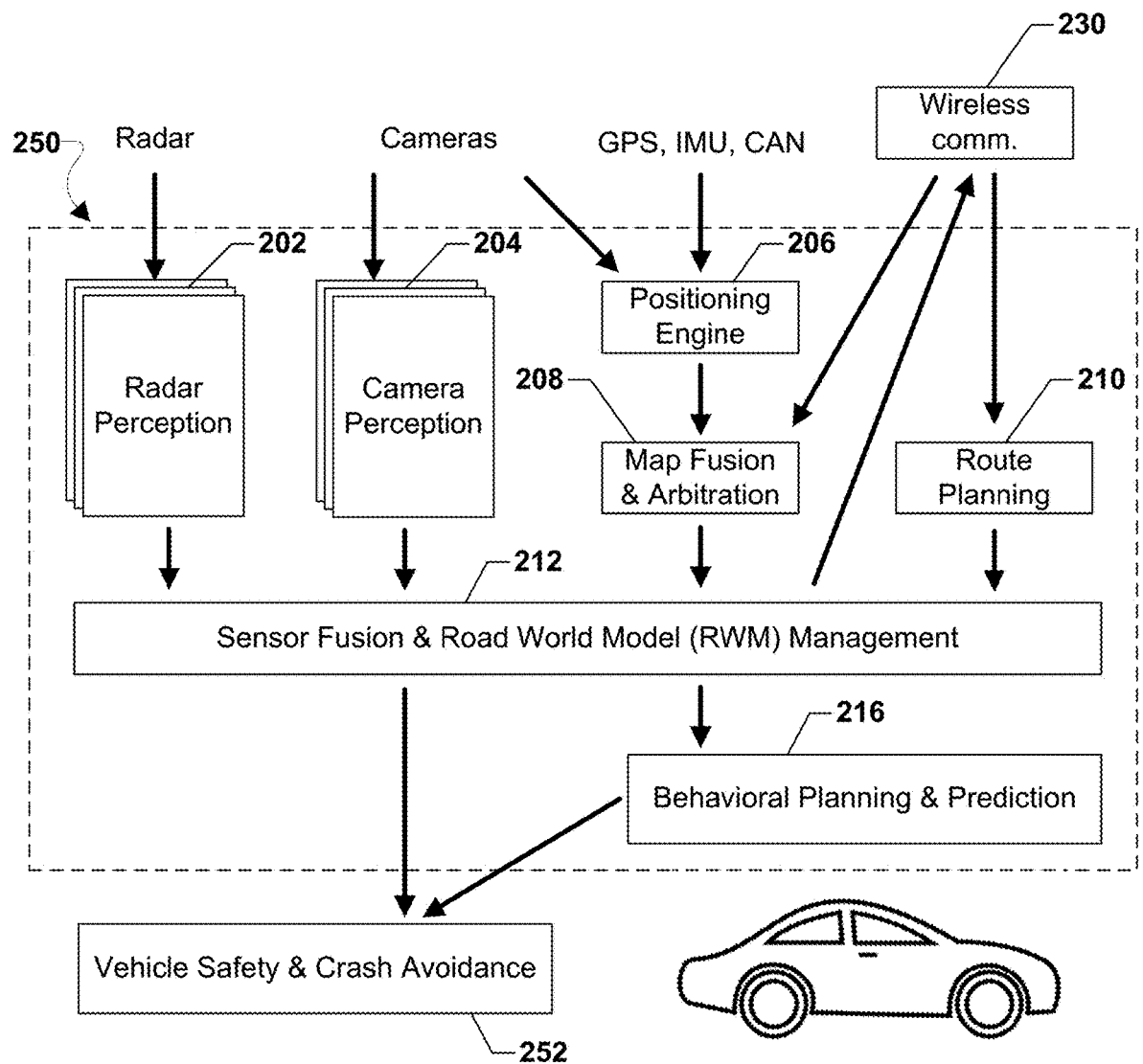
FIG. 2B is a component block diagram illustrating components of another example vehicle management system according to various embodiments

FIG. 2B illustrates an example of subsystems, computational elements, computing devices or units within a vehicle management system 250, which may be utilized within a vehicle 100. With reference to FIGS. 1A-2B, in some embodiments, the layers 202, 204, 206, 208, 210, 212, and 216 of the vehicle management system stack 200 may be similar to those described with reference to FIG. 2A and the vehicle management system stack 250 may operate similar to the vehicle management system stack 200, except that the vehicle management system stack 250 may pass various data or instructions to a vehicle safety and crash avoidance system 252 rather than the DBW system/control unit 220. For example, the configuration of the vehicle management system stack 250 and the vehicle safety and crash avoidance system 252 illustrated in FIG. 2B may be used in a non-autonomous vehicle.

In various embodiments, the behavioral planning and prediction layer 216 and/or sensor fusion and RWM management layer 212 may output data to the vehicle safety and crash avoidance system 252. For example, the sensor fusion and RWM management layer 212 may output sensor data as part of refined location and state information of the vehicle 101 provided to the vehicle safety and crash avoidance system 252. The vehicle safety and crash avoidance system 252 may use the refined location and state information of the vehicle 101 to make safety determinations relative to the vehicle 101 and/or occupants of the vehicle 100. As another example, the behavioral planning and prediction layer 216 may output behavior models and/or predictions related to the motion of other vehicles to the vehicle safety and crash avoidance system 252. The vehicle safety and crash avoidance system 252 may use the behavior models and/or predictions related to the motion of other vehicles to make safety determinations relative to the vehicle 101 and/or occupants of the vehicle 100.

In various embodiments, the vehicle safety and crash avoidance system 252 may include functionality that performs safety checks or oversight of various commands, planning, or other decisions of various layers, as well as human driver actions, that could impact vehicle and occupant safety. In some embodiments, a variety of safety parameters may be stored in memory and the vehicle safety and crash avoidance system 252 may compare a determined value (e.g., relative spacing to a nearby vehicle, distance from the roadway centerline, etc.) to corresponding safety parameter(s), and issue a warning or command if the safety parameter is or will be violated. For example, a vehicle safety and crash avoidance system 252 may determine the current or future separate distance between another vehicle (as defined by the sensor fusion and RWM management layer 212) and the vehicle (e.g., based on the world model refined by the sensor fusion and RWM management layer 212), compare that separation distance to a safe separation distance parameter stored in memory, and issue instructions to a driver to speed up, slow down or turn if the current or predicted separation distance violates the safe separation distance parameter. As another example, a vehicle safety and crash avoidance system 252 may compare a human driver's change in steering wheel angle to a safe wheel angle limit or parameter, and issue an override command and/or alarm in response to the steering wheel angle exceeding the safe wheel angle limit.

Figure 3:
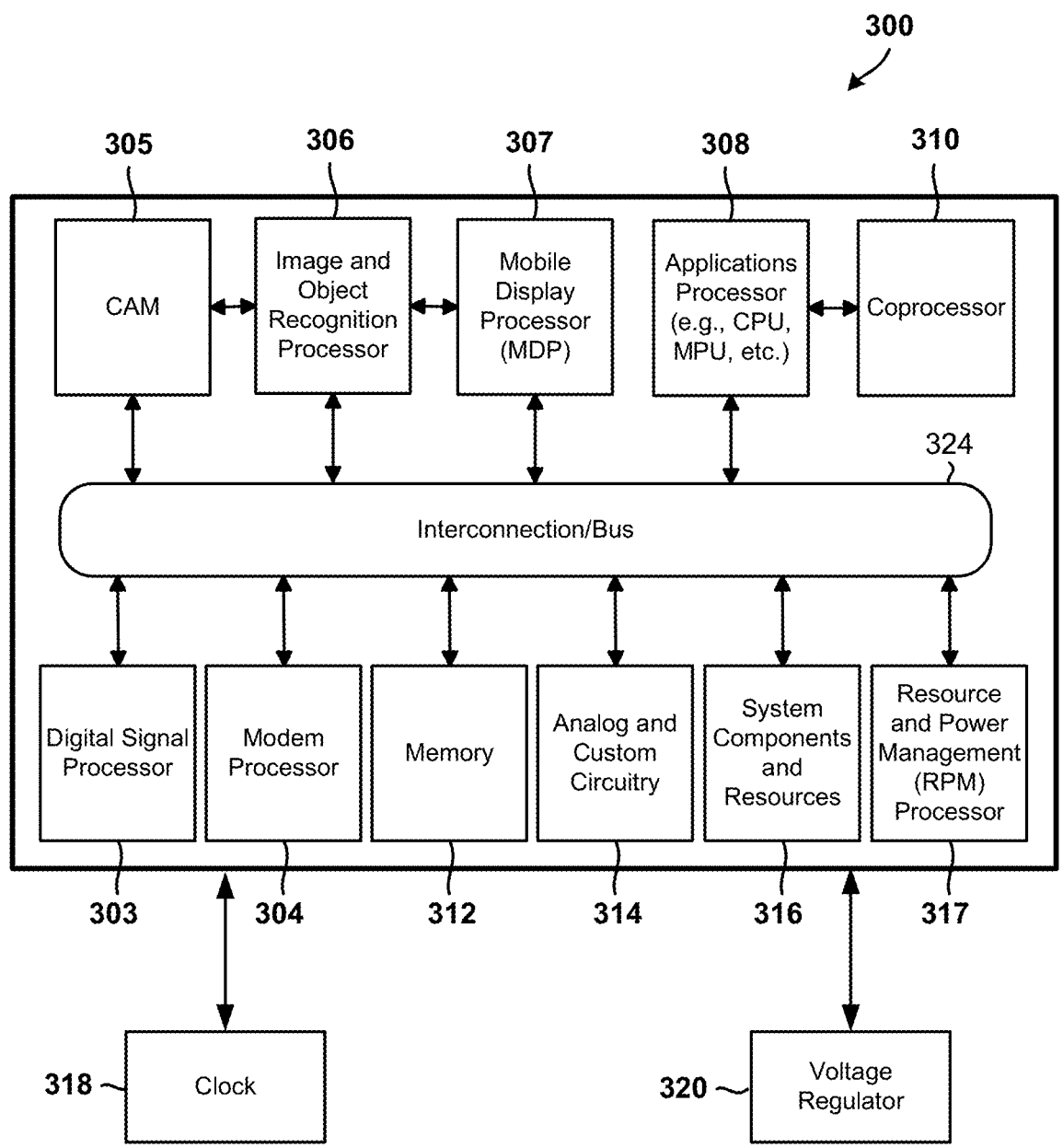
FIG. 3 is a block diagram illustrating components of a system on chip for use in a vehicle in accordance with various embodiments.

FIG. 3 illustrates an example system-on-chip (SOC) architecture of a processing device SOC 300 suitable for implementing various embodiments in vehicles. With reference to FIGS. 1A-3, the processing device SOC 300 may include a number of heterogeneous processors, such as a digital signal processor (DSP) 303, a modem processor 304, an image and object recognition processor 306, a mobile display processor 307, an applications processor 308, and a resource and power management (RPM) processor 317. The processing device SOC 300 may also include one or more coprocessors 310 (e.g., vector co-processor) connected to one or more of the heterogeneous processors 303, 304, 306, 307, 308, 317. Each of the processors may include one or more cores, and an independent/internal clock. Each processor/core may perform operations independent of the other processors/cores. For example, the processing device SOC 300 may include a processor that executes a first type of operating system (e.g., FreeBSD, LINUX, OS X, etc.) and a processor that executes a second type of operating system (e.g., Microsoft Windows). In some embodiments, the applications processor 308 may be the SOC's 300 main processor, central processing unit (CPU), microprocessor unit (MPU), arithmetic logic unit (ALU), etc. The graphics processor 306 may be graphics processing unit (GPU).

The processing device SOC 300 may include analog circuitry and custom circuitry 314 for managing sensor data, analog-to-digital conversions, wireless data transmissions, and for performing other specialized operations, such as processing encoded audio and video signals for rendering in a web browser. The processing device SOC 300 may further include system components and resources 316, such as voltage regulators, oscillators, phase-locked loops, peripheral bridges, data controllers, memory controllers, system controllers, access ports, timers, and other similar components used to support the processors and software clients (e.g., a web browser) running on a computing device.

The processing device SOC 300 also include specialized circuitry for camera actuation and management (CAM) 305 that includes, provides, controls and/or manages the operations of one or more cameras 158, 160 (e.g., a primary camera, webcam, 3D camera, etc.), the video display data from camera firmware, image processing, video preprocessing, video front-end (VFE), in-line JPEG, high definition video codec, etc. The CAM 305 may be an independent processing unit and/or include an independent or internal clock.

In some embodiments, the image and object recognition processor 306 may be configured with processor-executable instructions and/or specialized hardware configured to perform image processing and object recognition analyses involved in various embodiments. For example, the image and object recognition processor 306 may be configured to perform the operations of processing images received from cameras (e.g., 122, 136) via the CAM 305 to recognize and/or identify other vehicles, and otherwise perform functions of the camera perception layer 204 as described. In some embodiments, the processor 306 may be configured to process radar or lidar data and perform functions of the radar perception layer 202 as described.

The system components and resources 316, analog and custom circuitry 314, and/or CAM 305 may include circuitry to interface with peripheral devices, such as cameras 158, 160, radar 168, lidar 170, electronic displays, wireless communication devices, external memory chips, etc. The processors 303, 304, 306, 307, 308 may be interconnected to one or more memory elements 312, system components and resources 316, analog and custom circuitry 314, CAM 305, and RPM processor 317 via an interconnection/bus module 324, which may include an array of reconfigurable logic gates and/or implement a bus architecture (e.g., CoreConnect, AMBA, etc.). Communications may be provided by advanced interconnects, such as high-performance networks-on chip (NoCs).

The processing device SOC 300 may further include an input/output module (not illustrated) for communicating with resources external to the SOC, such as a clock 318 and a voltage regulator 320. Resources external to the SOC (e.g., clock 318, voltage regulator 320) may be shared by two or more of the internal SOC processors/cores (e.g., a DSP 303, a modem processor 304, a graphics processor 306, an applications processor 308, etc.).

In some embodiments, the processing device SOC 300 may be included in a control unit (e.g., 140) for use in a vehicle (e.g., 100). The control unit may include communication links for communication with a telephone network (e.g., 180), the Internet, and/or a network server (e.g., 184) as described.

The processing device SOC 300 may also include additional hardware and/or software components that are suitable for collecting sensor data from sensors, including motion sensors (e.g., accelerometers and gyroscopes of an IMU), user interface elements (e.g., input buttons, touch screen display, etc.), microphone arrays, sensors for monitoring physical conditions (e.g., location, direction, motion, orientation, vibration, pressure, etc.), cameras, compasses, GPS receivers, communications circuitry (e.g., Bluetooth®, WLAN, WiFi, etc.), and other well-known components of modern electronic devices.

Figure 4:
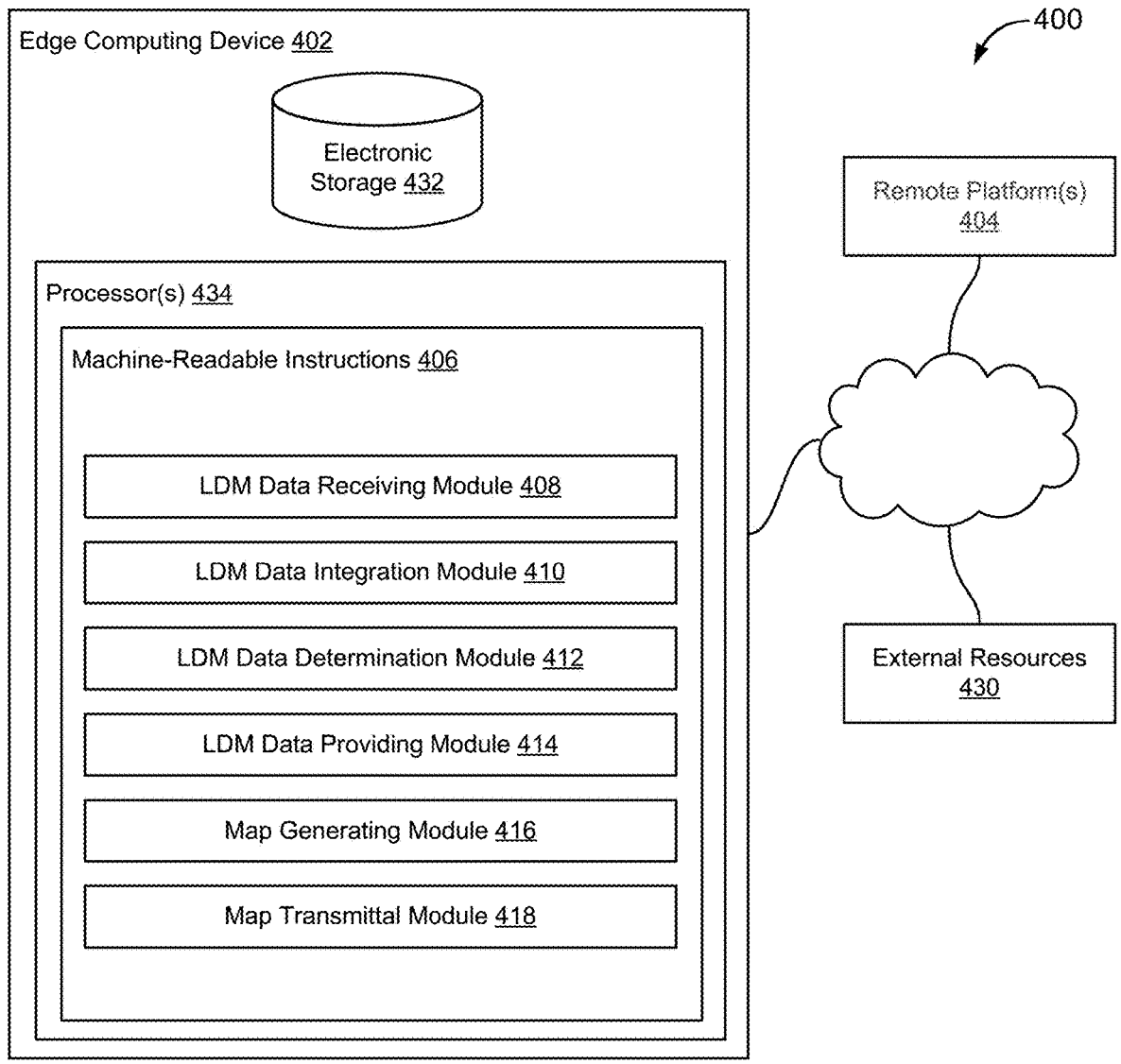
FIG. 4 is a component block diagram illustrating a system configured to generate local dynamic map data in accordance with various embodiments.

FIG. 4 is a component block diagram illustrating a system 400 configured to generate local dynamic map data in accordance with various embodiments. In some embodiments, the system 400 may include one or more computing platforms 402 and/or one or more mobile devices 404. With reference to FIGS. 1A-4, the Edge computing device 402 may include a processor (e.g., 164), a processing device (e.g., 300), and/or a control unit (e.g., 104) (variously referred to as a "processor"). The Edge computing device may be part of an Edge network 134 and/or a network element. The mobile device(s) 404 may include a processor (e.g., 164), a processing device (e.g., 300), and/or a control unit (e.g., 104) (variously referred to as a "processor") of a vehicle (e.g., 100).

The Edge computing device 402 may be configured by machine-executable instructions 406. Machine-executable instructions 406 may include one or more instruction modules. The instruction modules may include computer program modules. The instruction modules may include one or more of an LDM data receiving module 408, an LDM data integration module 410, an LDM data determination module 412, an LDM data providing module 414, a map generating module 416, a map transmittal module 418, and/or other instruction modules.

The LDM data receiving module 408 may be configured to receive fresh LDM data for a service area of an Edge computing device. In some embodiments, the LDM data receiving module 408 may be configured to receive a registration message from vehicles and mobile devices. In some embodiments, the LDM data receiving module 408 may be configured to receive planned route information from vehicles and mobile devices. In some embodiments, the LDM data receiving module 408 may be configured to receive mobile device kinematics information from vehicles and mobile devices. In some embodiments, the LDM data receiving module 408 may be configured to receive data from vehicles and mobile devices, such as, for example, sensor data, image data, audio data, or operating state data obtained by the vehicles and mobile devices.

The LDM data integration module 410 may be configured to integrate the fresh LDM data into an LDM data model. In some embodiments, the LDM data model may include LDM data of the service area of the Edge computing device.

The LDM data determination module 412 may be configured to determine LDM data of the LDM data model that is relevant to particular vehicles and mobile devices. In some embodiments, the LDM data determination module 412 may be configured to determine LDM data that is relevant to a mobile device based on information included with the registration message. In some embodiments, the LDM data determination module 412 may be configured to determine LDM data that is relevant to particular vehicles and mobile devices based on the planned route information. In some embodiments, the LDM data determination module 412 may be configured to determine LDM data that is relevant to particular vehicles and mobile devices based on kinematics information. In some embodiments, the LDM data determination module 412 may be configured to determine from the received data information that is relevant to the LDM data. In some implementations, the LDM data determination module 412 may receive the fresh data via an Edge network interface.

The LDM data providing module 414 may be configured to provide the determined relevant LDM data to vehicles and mobile devices. In some embodiments, the determined relevant LDM data may include highly dynamic LDM information.

The map generating module 416 may be configured to generate a digital map encompassing an area within a predetermined distance of vehicles and mobile devices. In some embodiments, the map transmittal module 418 may be configured to transmit the digital map to vehicles and mobile devices. The digital map may be generated and transmitted in a format suitable for use in autonomous navigation of the vehicles.

In some implementations, the Edge computing device 402, vehicles and mobile devices 404, and/or external resources 430 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which Edge computing device 402, vehicles and mobile devices 404, and/or external resources 430 may be operatively linked via some other communication media.

The mobile device 404 may include one or more processors configured to execute computer program modules. The computer program modules may be configured to enable an expert or user associated with a given vehicle or mobile device 404 to interface with system 400 and/or external resources 430, and/or provide other functionality attributed herein to vehicles and mobile devices 404.

The external resources 430 may include sources of information outside of system 400, external entities participating with system 400, and/or other resources. In some implementations, some or all of the functionality attributed herein to external resources 430 may be provided by resources included in system 400.

The Edge computing device 402 may include an electronic storage 432, one or more processors 434, and/or other components. The Edge computing device 402 may include communication lines, or ports to enable the exchange of information with a network and/or other computing platforms. The illustration of an Edge computing device 402 in FIG. 4 is not intended to be limiting. The Edge computing device 402 may include a plurality of hardware, software, and/or firmware components operating together to provide the functionality attributed herein to Edge computing device 402. For example, the Edge computing device 402 may be implemented by a cloud of computing platforms operating together as Edge computing device 402.

The electronic storage 432 may comprise non-transitory storage media that electronically stores information. The electronic storage media of the electronic storage 432 may include one or both of system storage that is provided integrally (i.e., substantially non-removable) with Edge computing device 402 and/or removable storage that is removably connectable to Edge computing device 402 via, for example, a port (e.g., a universal serial bus (USB) port, a firewire port, etc.) or a drive (e.g., a disk drive, etc.). The electronic storage 432 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 432 may include one or more virtual storage resources (e.g., cloud storage, a virtual private network, and/or other virtual storage resources). The electronic storage 432 may store software algorithms, information determined by processor(s) 434, information received from Edge computing device 402, information received from mobile device(s) 404, and/or other information that enables Edge computing device 402 to function as described herein.

Processor(s) 434 may be configured to provide information processing capabilities in Edge computing device 402. As such, processor(s) 434 may include one or more of a digital processor, an analog processor, a digital circuit designed to process information, an analog circuit designed to process information, a state machine, and/or other mechanisms for electronically processing information. Although processor(s) 434 is shown in FIG. 4 as a single entity, this is for illustrative purposes only. In some implementations, processor(s) 434 may include a plurality of processing units. These processing units may be physically located within the same device, or processor(s) 434 may represent processing functionality of a plurality of devices operating in coordination. Processor(s) 434 may be configured to execute modules 408, 410, 412, 414, 416, 418, and/or other modules. Processor(s) 434 may be configured to execute modules 408, 410, 412, 414, 416, 418, and/or other modules by software;

hardware; firmware; some combination of software, hardware, and/or firmware; and/or other mechanisms for configuring processing capabilities on the processor(s) 434. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 408-418 are illustrated in FIG. 4 as being implemented within a single processing unit, in implementations in which the processor(s) 434 includes multiple processing units, one or more of the modules 408-418, may be implemented remotely from the other modules. The description of the functionality provided by the different modules 408-418 described below is for illustrative purposes, and is not intended to be limiting, as any of the modules 408-418 may provide more or less functionality than is described. For example, one or more of modules 408-418 may be eliminated, and some or all of its functionality may be provided by other ones of the modules 408-418. As another example, processor(s) 434 may be configured to execute one or more additional modules that may perform some or all of the functionality attributed below to one of the modules 408-418.

Figure 5:
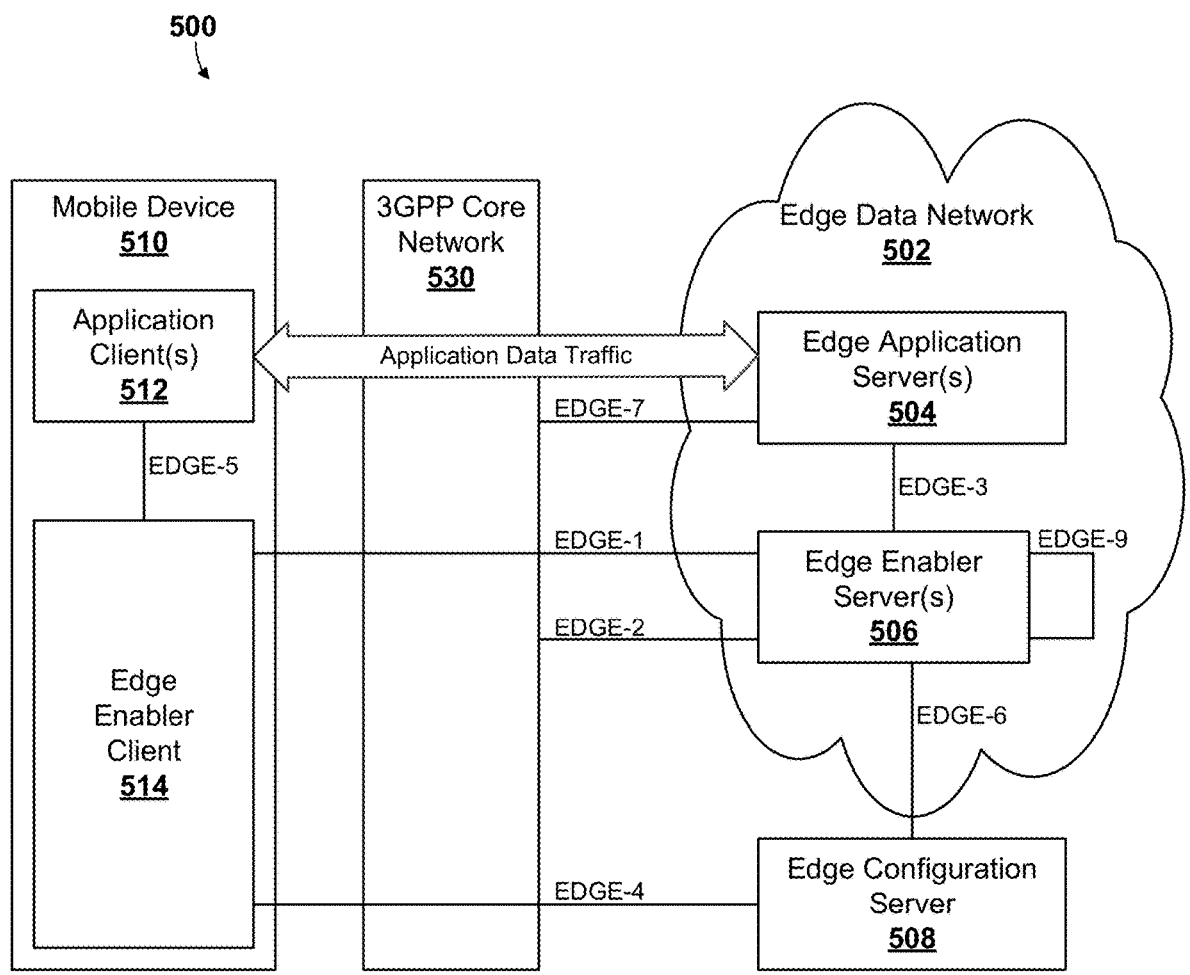
FIG. 5 is a system block diagram illustrating an example Edge computing system suitable for use with various embodiments.

FIG. 5 is a system block diagram illustrating an example Edge computing system 500 suitable for use with various embodiments. In some embodiments, Edge computing system 500 may include an Edge network 502 and a mobile device 510 configured to communicate via a 3GPP core network 530. The Edge data network 502 may include an Edge application server 504 and one or more Edge enabler server(s) 506, in communication with an Edge configuration server 508. The mobile device 510 may include an application client(s) 512 in communication with one or more Edge enabler client(s) 514. Each of the elements of the Edge computing system 500 may communicate over an Edge interface (e.g., EDGE-1, EDGE-2, ... EDGE-9).

The Edge application server 504 and the application client(s) 512 each may be configured to process computing tasks, and may communicate application data traffic (i.e., data related to a computing task) via the 3GPP core network 530. The Edge enabler server(s) 506 may be configured to maintain and advertise (e.g., to devices such as the mobile device 510) applications provided by the Edge application server(s) 504. The Edge configuration server 508 may be configured to manage communication within and among one or more Edge data networks 502.

The Edge application server(s) 504 may provide information about its applications and their capabilities to the Edge enabler server(s) 506 via the EDGE-3 interface. The Edge enabler server(s) 506 may provide information about the Edge data network 502 to the Edge configuration server 508 via the EDGE-6 interface. The Edge application server(s) 504 and the Edge enabler server(s) 506 may communicate with the 3GPP core network 530 via the EDGE-7 interface and the EDGE-2 interface, respectively.

In some embodiments, the Edge enabler client(s) 514 may obtain information about the available Edge data networks 502 from the Edge enabler server 508 via the EDGE-1 interface (and/or from the Edge configuration server 508 via the EDGE-4 interface). In some embodiments, the Edge enabler client(s) 514 may obtain information about Edge application server(s) 504 such as available applications and their capabilities via the EDGE-4 interface. In some embodiments, the Edge enabler client 514, the Edge enabler server(s) 506, and the Edge configuration server 508 may employ a discovery and provisioning procedure via their respective Edge interfaces.

The application client 512 may communicate with the Edge enabler client(s) 514 via the EDGE-5 interface. In some embodiments, the Edge enabler client(s) 514 may obtain information about available Edge data networks 502 from the Edge configuration server 508 via the EDGE-4 interface, and may coordinate the use of the Edge application server(s) 504 with the Edge enabler server(s) 506 via the EDGE-1 interface. Edge enabler servers 506 may coordinate with one another via the EDGE-9 interface.

Figure 6:
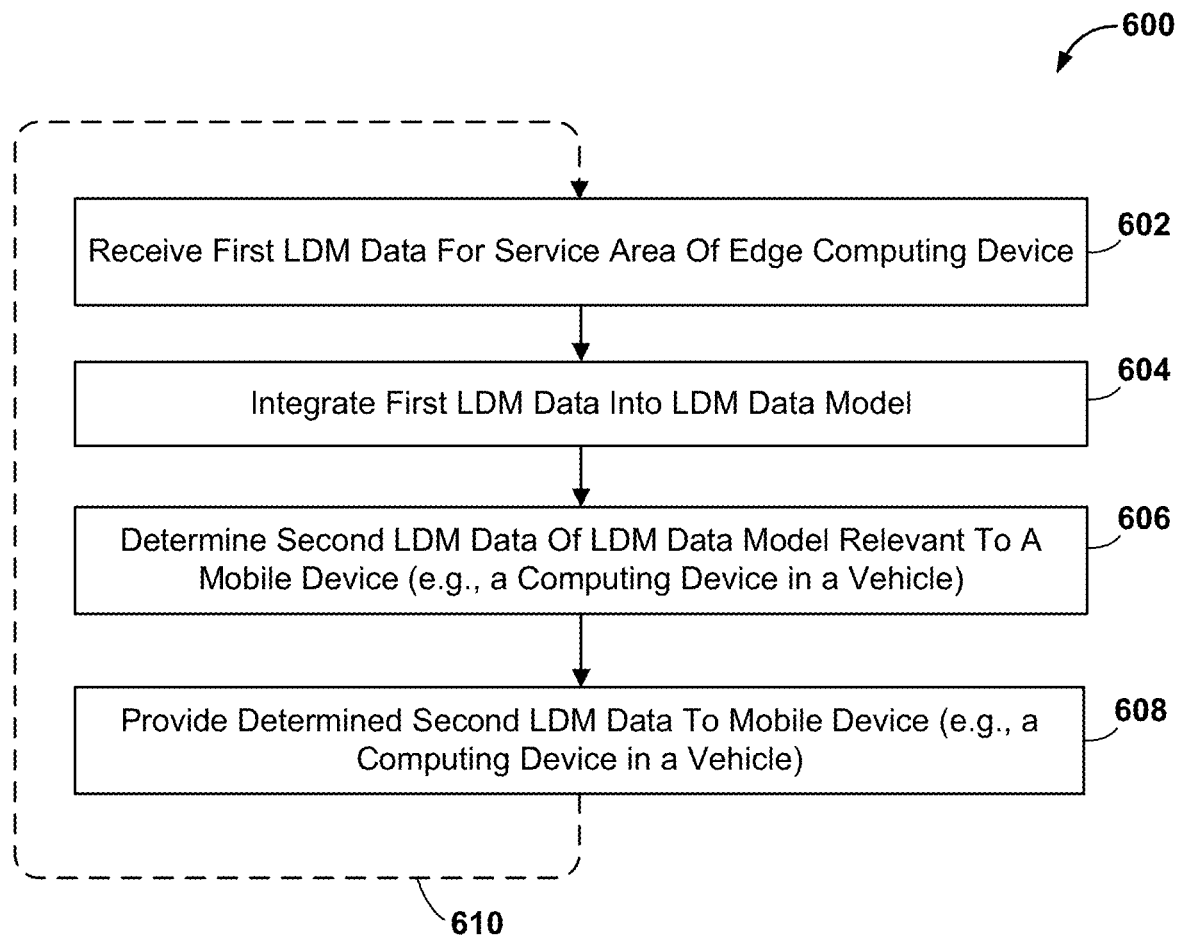
FIG. 6 is a process flow diagram illustrating operations of a method performed by a processor of an Edge computing device for generating LDM data in accordance with various embodiments.

FIG. 6 is a process flow diagram illustrating operations of a method 600 performed by a processor of an Edge computing device for generating LDM data in accordance with various embodiments. With reference to FIGS. 1-6, the operations of the method 600 may be performed by a processor of an Edge computing device (e.g., the Edge application server 504) in an Edge network (e.g., the Edge network 134, 502).

In block 602, the processor may receive new or updated (referred to as "first") LDM data for a service area of the Edge computing device. In some embodiments, the Edge computing device may receive the first LDM data via an Edge network interface. In some embodiments, the first LDM data may be highly dynamic information (e.g., as defined in relevant ETSI standards). In some embodiments, the first LDM data may be obtained from a sensor or another information source within a threshold amount of time (e.g., two seconds, one second, 250 ms, etc.). In some embodiments, the first LDM data may include data from vehicles and mobile devices such as sensor data, image data, audio data, or operating state data of the vehicles and mobile devices. In such embodiments, the Edge computing device may determine information that should be integrated into an LDM data model.

In block 604, the processor may integrate the first LDM data into an LDM data model. In some embodiments, the LDM data model represents an aggregation of LDM data for the service area of the Edge computing device.

In block 606, the processor may determine second LDM data of the LDM data model that is relevant to a particular vehicle or mobile device. In some embodiments, the Edge computing device may determine the second LDM data of the LDM data model that is relevant to a particular mobile device, and may provide that determined relevant LDM data (i.e., the second LDM data) to the particular vehicle or mobile device. In some embodiments, the second LDM data may be highly dynamic LDM information (e.g., as defined in relevant ETSI standards).

In block 608, the processor may provide the determined second LDM data to the particular vehicle or mobile device.

In optional operation 610, the processor may repeat the operations of blocks 602-608 to receive first LDM data and determine second LDM data that is relevant to the particular vehicle or mobile device.

Figure 7:
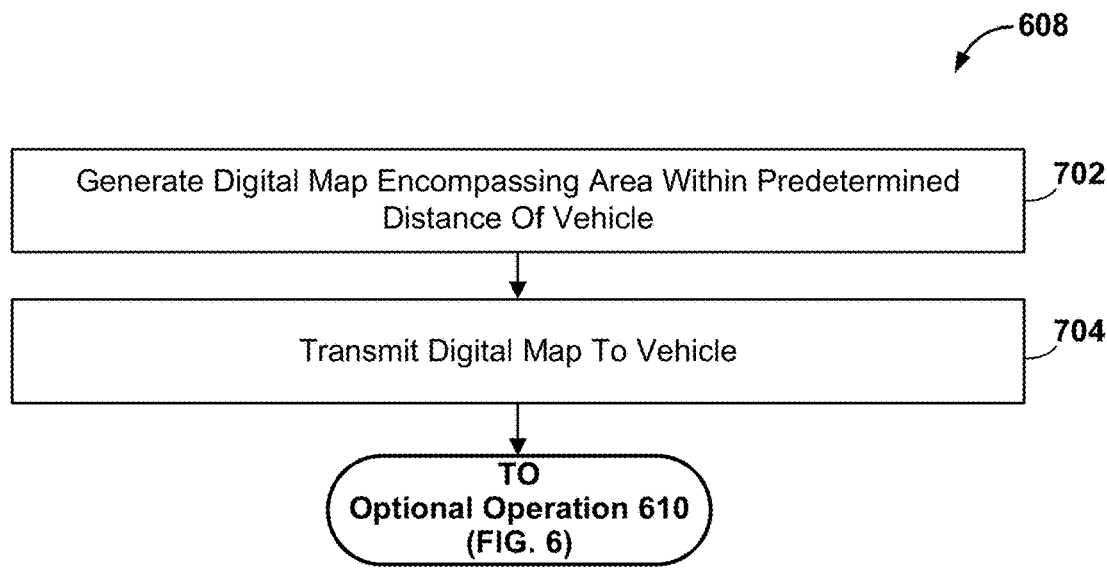
FIGS. 7-15 are process flow diagrams illustrating operations that may be performed by a processor of an Edge computing device as part of the method for generating LDM data in accordance with various embodiments.

FIG. 7 is a process flow diagram illustrating operations that may be performed by a processor of an Edge computing device as part of the method 600 for generating LDM data in accordance with various embodiments. With reference to FIGS. 1-7, the operations may be performed by a processor of an Edge computing device (e.g., the Edge application server 504) in an Edge network (e.g., the Edge network 134, 502).

In block 702, the processor may generate a digital map encompassing an area within a predetermined distance of a vehicle. For example, in some embodiments a mobile device may include a computing device in a vehicle. In some embodiments, the processor may use a predetermined distance from the vehicle to generate a digital map encompassing an area within the predetermined distance. In some embodiments, the processor may dynamically determine a distance from the vehicle based on information about the vehicle. Such information may include, for example, a vehicle location, a vehicle direction and speed of motion, other vehicle kinematics information, and static LDM data about road and geographic features around the vehicle (e.g., nearby roads, topographical features, and the like). Such information may also include, for example, an observed route or path of the vehicle, path planning information from the vehicle (e.g., an intended or planned route of travel), and other suitable information.

In block 704, the processor may transmit the digital map to the vehicle. In some embodiments, the digital map may be generated and transmitted in a format suitable for use in autonomous navigation of the vehicle.

The processor may perform optional operation 610 of the method 600 as described (FIG. 6).

Figure 8:
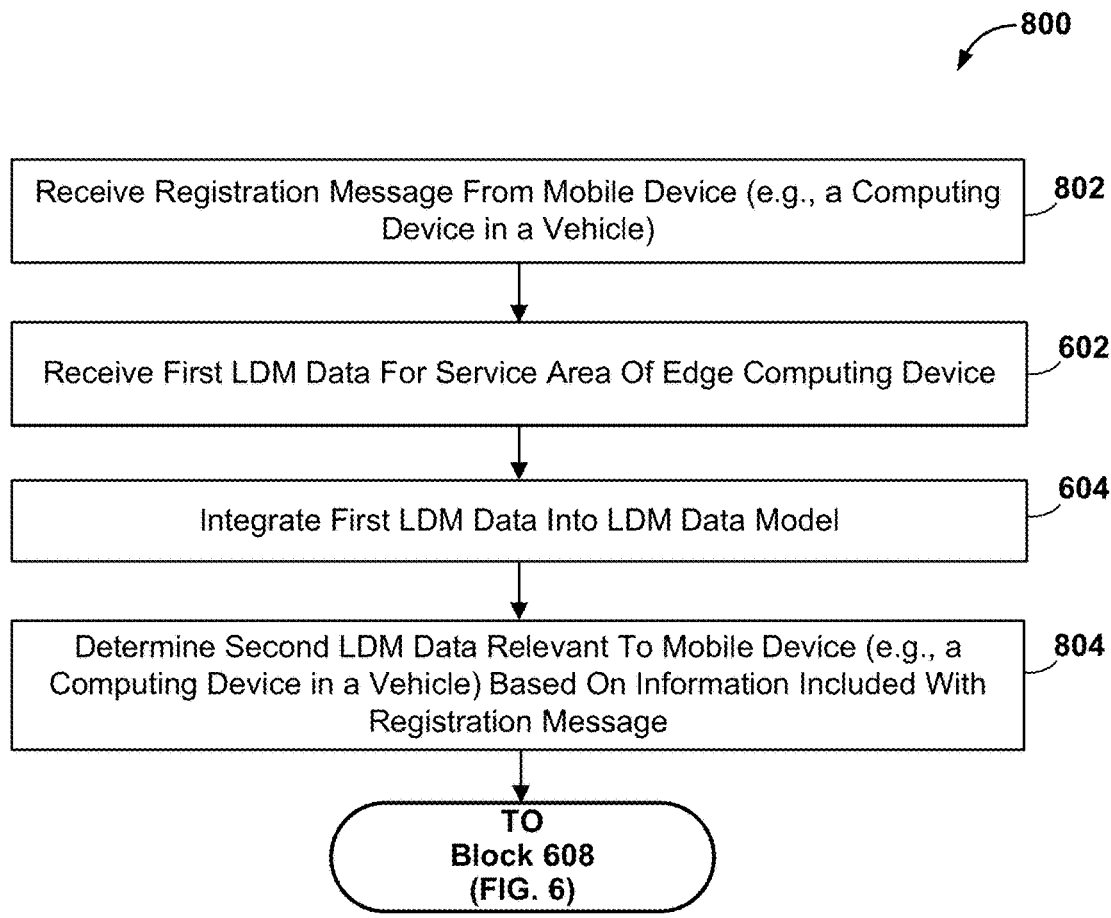

FIG. 8 is a process flow diagram illustrating operations that may be performed by a processor of an Edge computing device as part of the method 600 for generating LDM data in accordance with various embodiments. With reference to FIGS. 1-8, the operations may be performed by a processor of an Edge computing device (e.g., the Edge application server 504) in an Edge network (e.g., the Edge network 134, 502). In blocks 602 and 604, the processor may perform operations of like-numbered blocks of the method 600 as described.

In block 802, the processor may receive a registration message from the particular vehicle or mobile device. In some embodiments, the registration message may include a request to receive LDM data as a service from the Edge computing device. In some embodiments, the registration message may include or be transmitted with other information from the particular vehicle or mobile device, such as planned route information, information about kinematics of the particular vehicle or mobile device, and/or other suitable information from the particular vehicle or mobile device.

In block 804, the processor may determine second LDM data that is relevant to a particular vehicle or mobile device based on information included with the registration message. In some embodiments, the processor may use any information received from a particular vehicle or mobile device to determine second LDM data that is relevant to the particular vehicle or mobile device. For example, the processor may use the information transmitted from the particular vehicle or mobile device, such as planned route information, information about kinematics of the particular vehicle or mobile device, etc. to identify a route, path, or area along or through which the particular vehicle or mobile device may travel. As another example, the processor may use the information transmitted from the particular vehicle or mobile device to determine a radius, oval, or other area around the particular vehicle or mobile device. In some embodiments, the processor may use the information transmitted for the particular vehicle or mobile device, any identified route, path, or area, and/or any determined radius, oval, or other area around the particular vehicle or mobile device to determine the second LDM data that is relevant to the particular vehicle or mobile device. In some embodiments, the processor may determine highly dynamic LDM information that is relevant to the particular vehicle or mobile device.

The processor may perform the operations of block 608 of the method 600 as described (FIG. 6).

Figure 9:
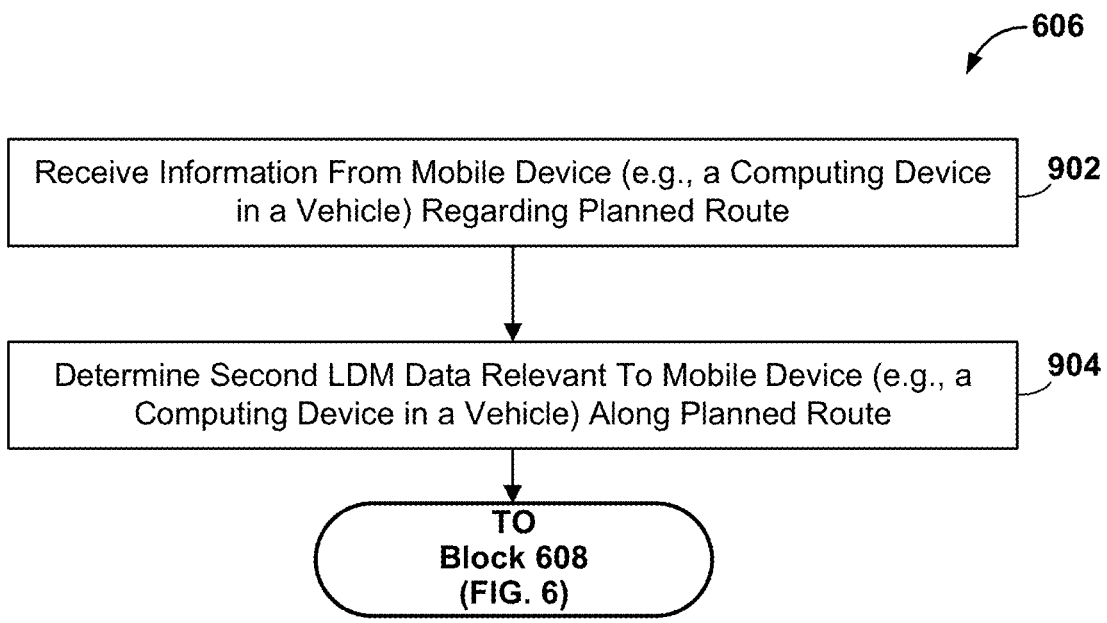

FIG. 9 is a process flow diagram illustrating operations that may be performed by a processor of an Edge computing device as part of the method 600 for generating LDM data in accordance with various embodiments. With reference to FIGS. 1-9, the operations may be performed by a processor of an Edge computing device (e.g., the Edge application server 504) in an Edge network (e.g., the Edge network 134, 502).

In block 902, the processor may receive information from a particular vehicle or mobile device regarding a planned route of the mobile device. For example, the processor may receive from the particular vehicle or mobile device path planning or route planning information related to intended motion or travel of the particular vehicle or mobile device.

In block 904, the processor may determine second LDM data that is relevant to a particular vehicle or mobile device based on the planned route information. For example, the processor may use the path planning or route planning information to determine second LDM data that is relevant to the particular vehicle or mobile device. In some embodiments, the processor may determine highly dynamic LDM information that is relevant to the particular vehicle or mobile device.

The processor may perform the operations of block 608 of the method 600 as described (FIG. 6).

Figure 10:
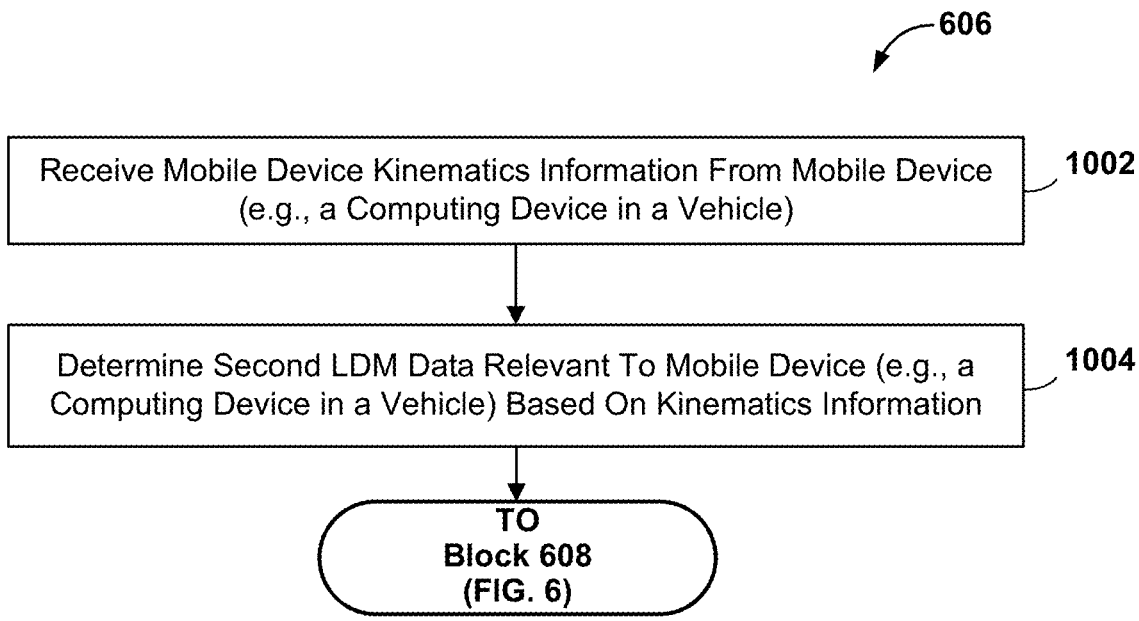

FIG. 10 is a process flow diagram illustrating operations that may be performed by a processor of an Edge computing device as part of the method 600 for generating LDM data in accordance with various embodiments. With reference to FIGS. 1-10, the operations may be performed by a processor of an Edge computing device (e.g., the Edge application server 504) in an Edge network (e.g., the Edge network 134, 502).

In block 1002, the processor may perform operations including receiving vehicle or mobile device kinematics information from vehicles and mobile devices. In some embodiments, the kinematics information may include observable motions of vehicles and mobile devices, such as a direction, a speed, a path or route that has been traveled, waypoints, stops made, and other suitable observable motion information.

In block 1004, the processor may perform operations including determining second LDM data that is relevant to a particular vehicle or mobile device based on the particular vehicle or mobile device kinematics information. For example, the processor may use the kinematics to determine second LDM data that is relevant to the particular vehicle or mobile device. In some embodiments, the processor may determine highly dynamic LDM information that is relevant to the particular vehicle or mobile device.

The processor may perform the operations of block 608 of the method 600 as described (FIG. 6).

Figure 11:
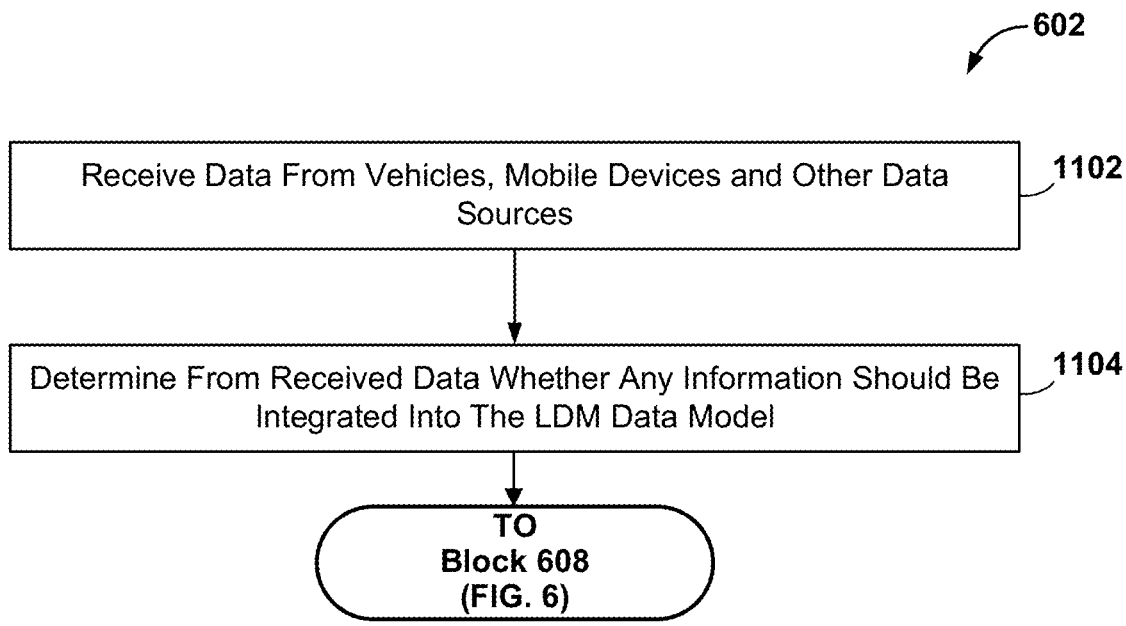

FIG. 11 is a process flow diagram illustrating operations that may be performed by a processor of an Edge computing device as part of block 602 of the method 600 for generating LDM data in accordance with various embodiments. With reference to FIGS. 1-11, the operations may be performed by a processor of an Edge computing device (e.g., the Edge application server 504) in an Edge network (e.g., the Edge network 134, 502).

In block 1102, the processor may receive data from vehicles, mobile devices and other data sources. In some embodiments, received data may include one or more of sensor data, image data, audio data, or operating state data obtained by the vehicles and mobile devices. In some embodiments, the processor may receive data from other data sources, such as roadside units (RSUs), data sources that may transmit Cooperative Awareness Message (CAM) messages or Decentralized Environmental Notification Message (DENM) messages, and a variety of Internet- or cloud-based resources.

In block 1104, the processor may determine from the received data whether there is any information that should be integrated into the LDM data model. For example, the processor may select from among received sensor data, image data, audio data, operating state data and/or inputs received from other data sources information that will augment or improve the LDM data model, while information that is redundant or irrelevant to the LDM data model may be ignored. In some embodiments, the processor may determine highly dynamic LDM information, as such information is defined in relevant ETSI standards, that should be integrated into the LDM data model.

The processor may perform the operations of block 608 of the method 600 as described (FIG. 6).

Figure 12:
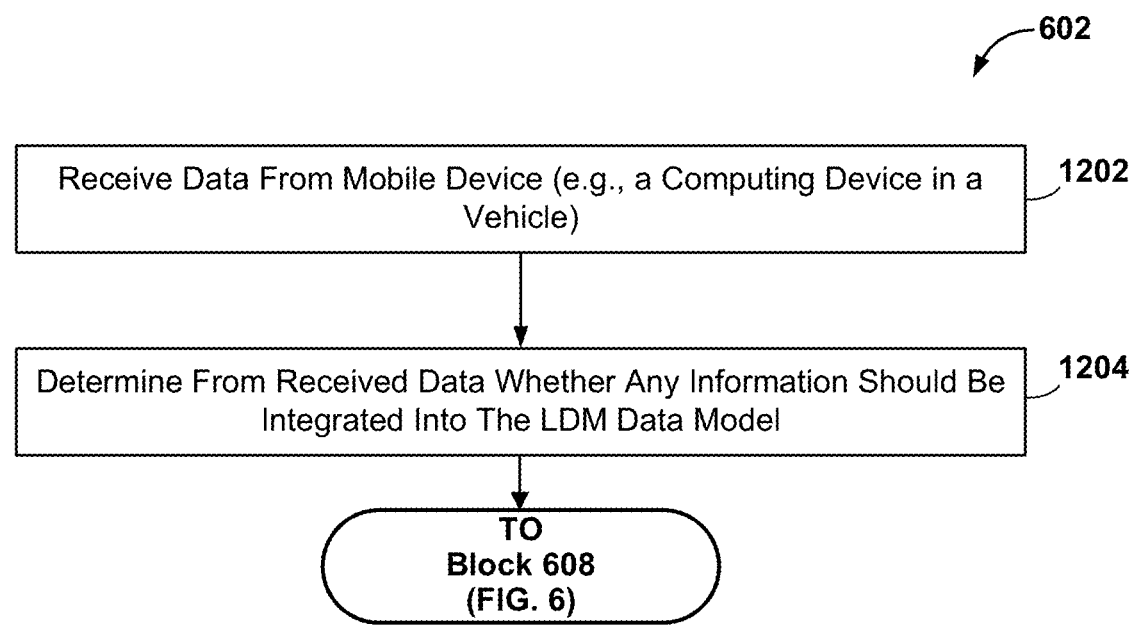

FIG. 12 is a process flow diagram illustrating operations that may be performed by a processor of an Edge computing device as part of block 602 of the method 600 for generating LDM data in accordance with various embodiments. With reference to FIGS. 1-12, the operations of the method 602 may be performed by a processor of an Edge computing device (e.g., the Edge application server 504) in an Edge network (e.g., the Edge network 134, 502).

In block 1202, the processor may receive data from the mobile device (e.g., a computing device in a vehicle). In some embodiments, received data may include one or more of sensor data, image data, audio data, or operating state data obtained by the mobile device.

In block 1204, the processor may determine from the received data whether any information should be integrated into the LDM data model. For example, the processor may select mobile device sensor data, image data, audio data, and/or operating state data to determine LDM data that will augment, update or otherwise enhance the LDM data model. In some embodiments, the processor may determine highly dynamic LDM information, as such information is defined in relevant ETSI standards, that should be integrated into the LDM data model.

The processor may perform the operations of block 608 of the method 600 as described (FIG. 6).

Figure 13:
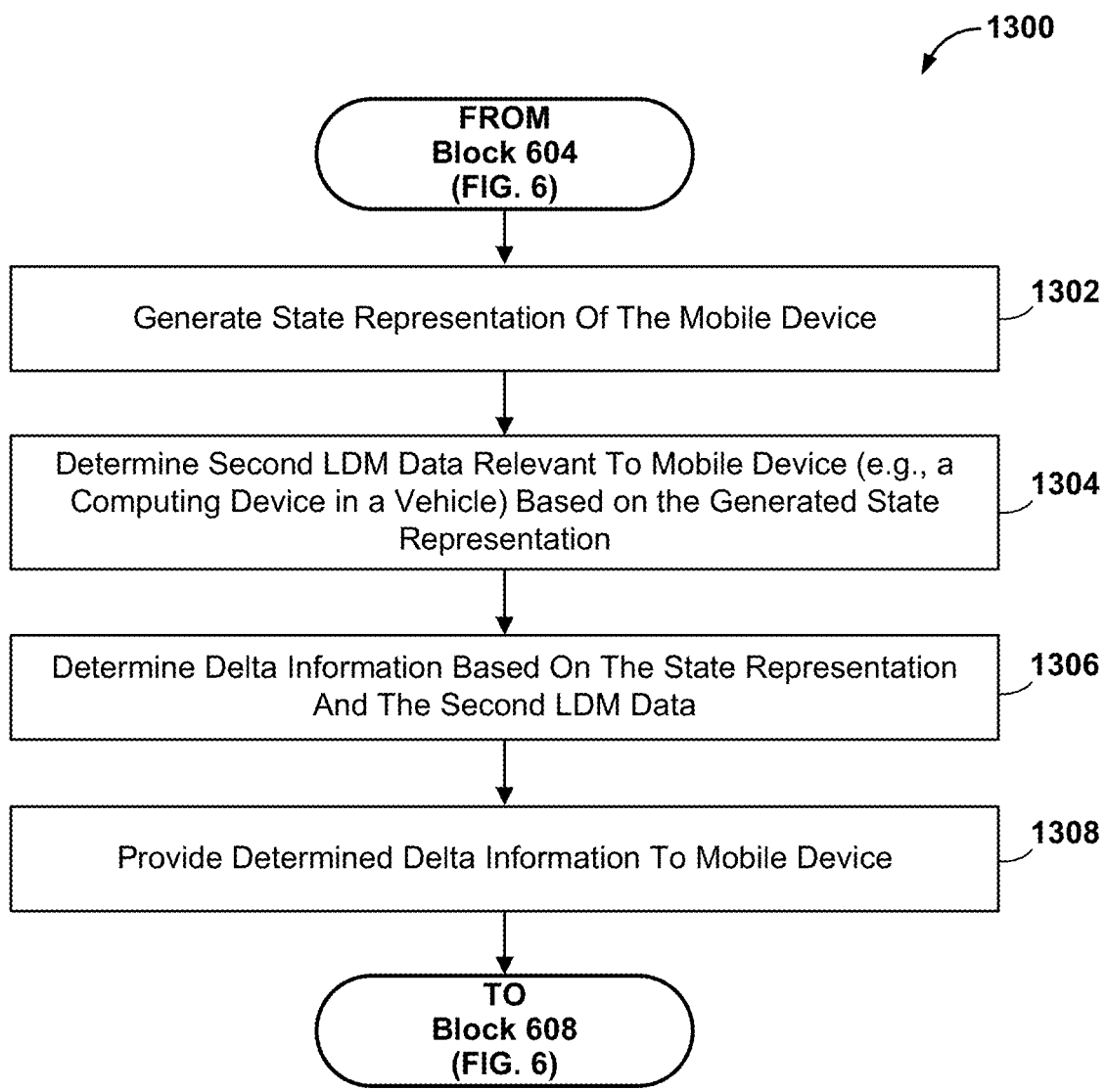

FIG. 13 is a process flow diagram illustrating operations 1300 that may be performed by a processor of an Edge computing device as part of the method 600 for generating LDM data in accordance with various embodiments. With reference to FIGS. 1-13, the operations 1300 may be performed by a processor of an Edge computing device (e.g., the Edge application server 504) in an Edge network (e.g., the Edge network 134, 502).

Following performance of the operations of block 604 of the method 600, the processor may generate a state representation of the mobile device in block 1302. For example, an EAS 184a-184c may generate a state representation of the mobile device. As noted above, the state representation may include device-descriptive information including a location, direction of motion, velocity, operational status, and other suitable information. In some embodiments, the state representation may also include a current LDM subset stored by or used by the mobile device.

In block 1304, the processor may determine the second LDM data relevant to the mobile device based on the generated state representation. In some embodiments, the processor may use the device-descriptive information in the state representation to determine the second LDM data relevant to the mobile device based on one or more parameters in the state representation. For example, based on a location and/or a direction of motion, the processor may include in the second LDM data certain LDM data near the location, along the direction of motion, etc.

In block 1306, the processor may determine delta information based on the state representation and the second LDM data. As noted above, in some embodiments, the processor may determine delta information representing differences between a state representation of the mobile device and current or recently updated LDM data.

In block 1308, the processor may provide the determined delta information to the mobile device. In some embodiments, the delta information may enable the mobile device to quickly and efficiently receive and implement updates to LDM data stored and used by the mobile device.

The processor may then perform the operations of block 608 of the method 600 (FIG. 6) as described.

Figure 14:
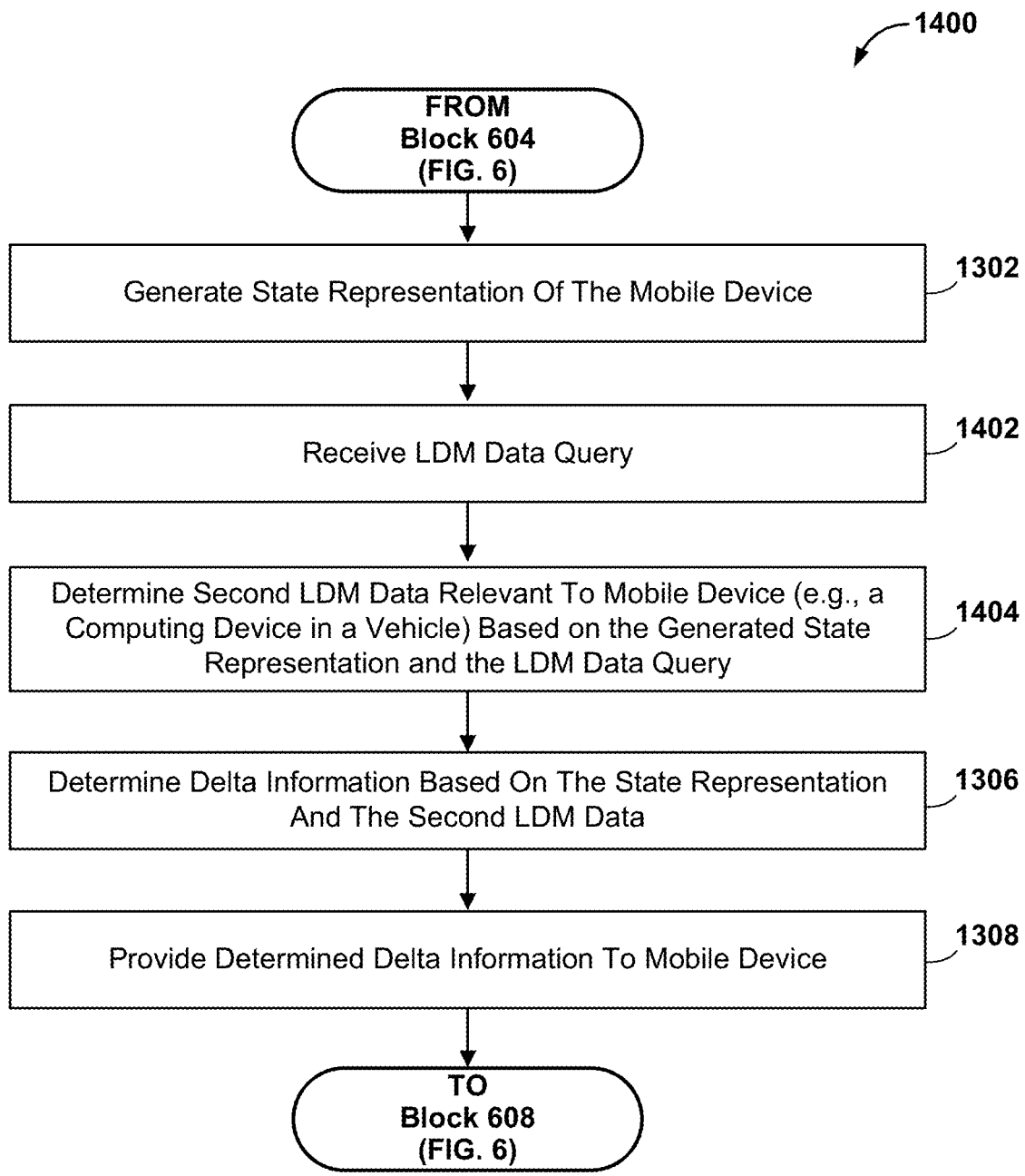

FIG. 14 is a process flow diagram illustrating operations 1400 that may be performed by a processor of an Edge computing device as part of the method 600 for generating LDM data in accordance with various embodiments. With reference to FIGS. 1-14, the operations 1400 may be performed by a processor of an Edge computing device (e.g., the Edge application server 504) in an Edge network (e.g., the Edge network 134, 502).

Following performance of the operations of block 1302 of the method 1300 (FIG. 13), the processor may receive an LDM data query in block 1402. For example, the processor may receive a query for a location (e.g., a specific address, store, building, etc.), a type of store or building at a location (e.g., "grocery store", "coffee shop", "bank", etc.), or a type of location (e.g., "a park", "a pool," "a parking space", "a beach", etc.). As another example, the processor may receive a query for a path or directions to a location. As another example, the processor may receive a query for highly dynamic map data (e.g., "food trucks in my area", "construction zones", "accidents", "speed traps", etc.).

In block 1404, the processor may determine the second LDM data that is relevant to a mobile device based on the generated state representation of the mobile device and the received LDM data query. For example, based on a LDM data query "find me a parking space" and the state representation (e.g., location and vector) of the mobile device (in this example, a vehicle), the processor may scan the LDM data to identify data parking space(s) within a threshold distance (e.g., 500 meters) of the mobile device, or along a path of travel (e.g., on the vehicle-side of the street instead of on the opposite side of the street from the vehicle). The processor may use other information from the state representation to further determine or refine the determination of relevant LDM data. For example, the processor may use information about a size or shape of the vehicle to identify a parking space in which the vehicle may fit, and discard parking spaces that cannot accommodate the vehicle.

The processor may then perform the operations of block 1306 of the method 1300 (FIG. 13) as described.

Figure 15:
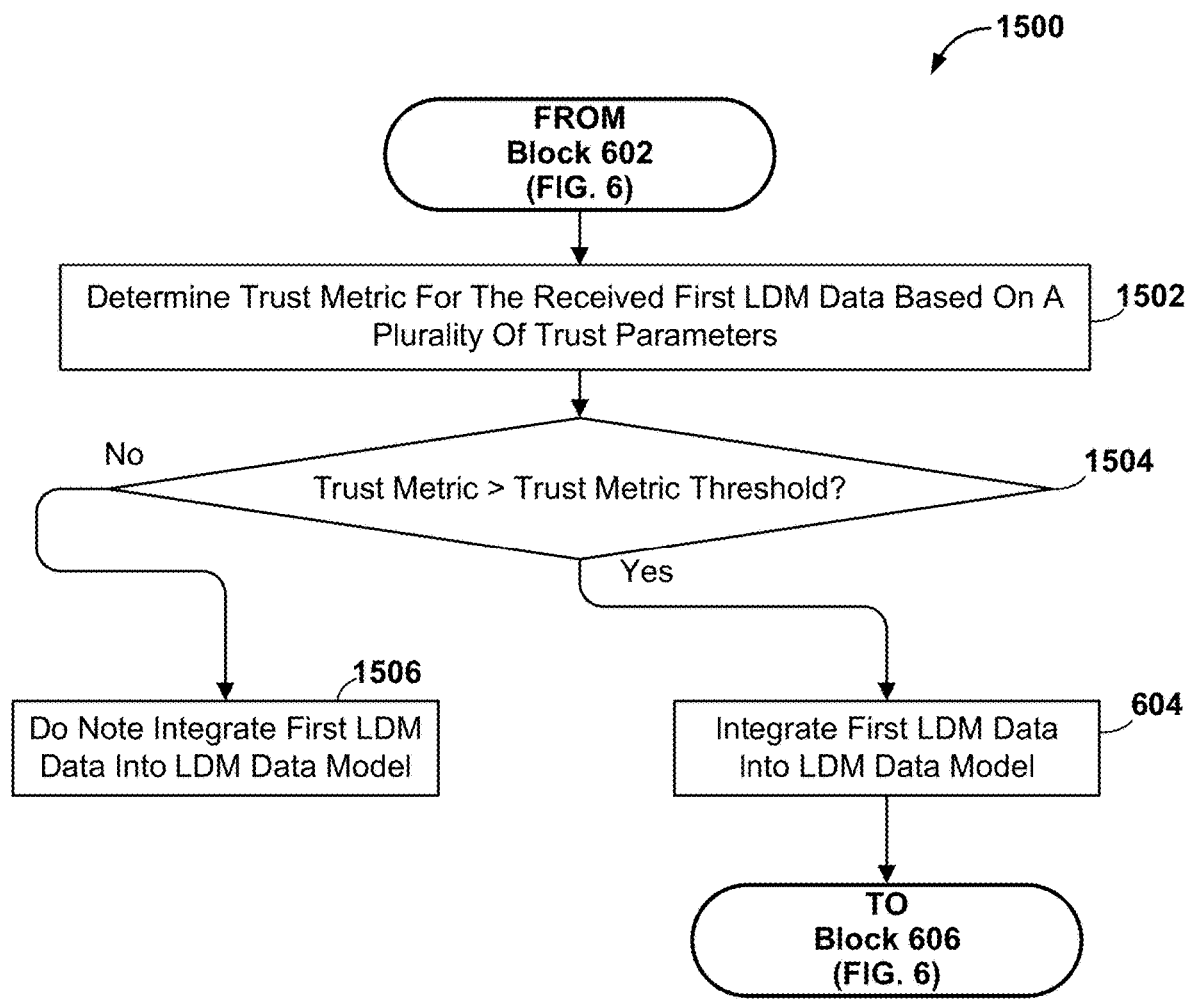

FIG. 15 is a process flow diagram illustrating operations 1500 that may be performed by a processor of an Edge computing device as part of the method 600 for generating LDM data in accordance with various embodiments. With reference to FIGS. 1-15, the operations 1500 may be performed by a processor of an Edge computing device (e.g., the Edge application server 504) in an Edge network (e.g., the Edge network 134, 502).

Following performance of the operations of block 602 of the method 600 (FIG. 6), the processor may determine a trust metric for the received first LDM data based on a plurality of mobile device parameters in block 1502. In some embodiments, the processor may perform a security function to safeguard the integrity of the LDM data against, for example, inaccurate LDM, false LDM data, attempts to introduce inaccurate or false information into the LDM data, LDM data that is too "noisy" to be reliable, and the like. In some embodiments, the processor may determine a trust metric based on a plurality of parameters for received LDM data. In some embodiments, the processor may determine the trust metric on a per-data basis, such as each time new LDM data is received from a mobile device (such as a vehicle).

In some embodiments, the trust metric may represent a trustworthiness score or trustworthiness rating of the received LDM data. In some embodiments, the trust metric may include a figure of trust or another similar trustworthiness score. The processor may determine the trust metric based on a plurality of factors and/or determinations, each of which may increase or decrease the overall trust metric. Each such factor or determination is referred to herein as a "trust parameter."

For example, the processor may determine whether LDM data received from one mobile device can be corroborated with LDM data from another source (e.g., another mobile device, roadside unit, server, etc.). The processor may determine that LDM data that can be corroborated is more trustworthy than LDM data that cannot be corroborated, and LDM data that can be corroborated may increase the trust metric. As another example, the processor may evaluate one or more factors related to the communication link over which the LDM data is received. Such factors may include, for example, a type of connection (cellular communications are generally more trustworthy than Bluetooth or Wi-Fi communications); a number of network node hops between the source device and the processor (e.g., the EAS 184); a level of communication link security (e.g., encrypted vs. non-encrypted, use of Transport Level Security (TLS), etc.); and the like. As another example, the processor may evaluate the trustworthiness of the source device, such as whether the device has been authenticated, the type and robustness of any authentication credentials presented by the source device, whether the processor can verify the credentials, whether the source device is registered with a network (e.g., a 3GPP network), whether the source device is registered with an Edge computing device (e.g., the EAS 184), and the like.

In determination block 1504, the processor may determine whether the trust metric exceeds a trust metric threshold. The trust metric threshold may be a configurable value that be set may a network operator, an equipment manufacture, a government entity, a standards body, a law enforcement entity, etc. In some embodiments, the trust metric threshold may vary depending upon the type of vehicle, an occupant of the vehicle, a location, and other parameters.

In response to determining that the trust metric does not exceed the trust metric threshold (i.e., determination block 1504="No"), the processor may not integrate the LDM data into the LDM data model in block 1506.

In response to determining that the trust metric exceeds the trust metric threshold (i.e., determination block 1504="Yes"), the processor may perform the operations of block 604 of the method (FIG. 6) as described to integrate the LDM data into the LDM data model.

Following the operations of block 604, the processor may perform the operations of block 606 of the method 600 (FIG. 6) as described.

Figure 16:
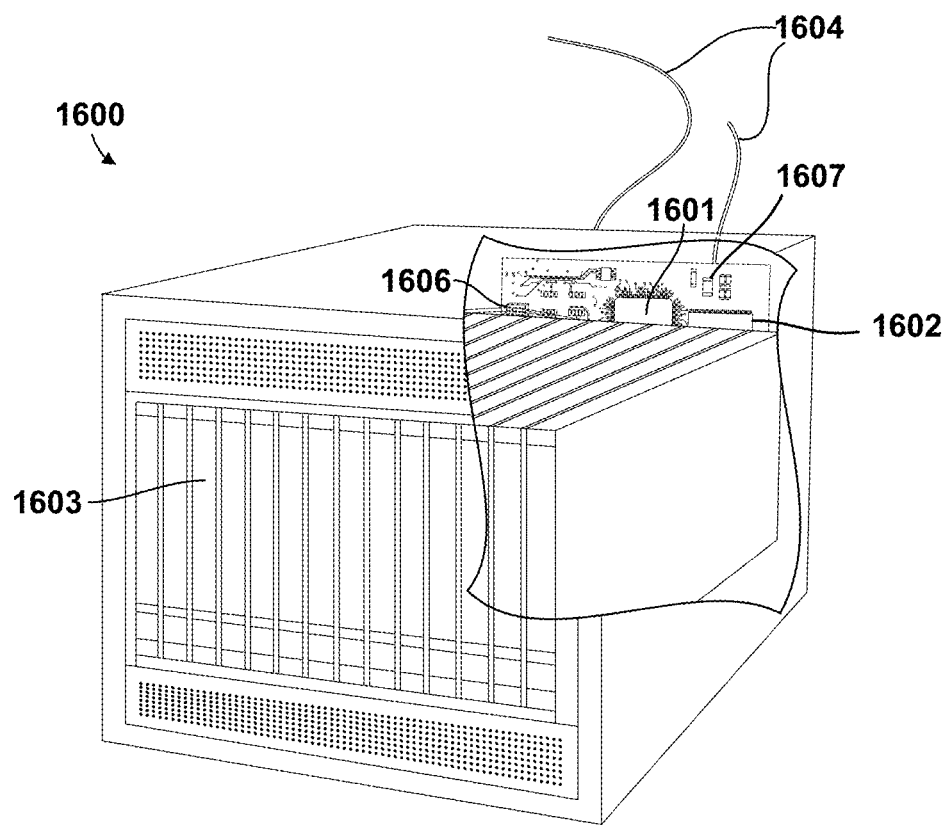
FIG. 16 is a component block diagram of an Edge computing device suitable for use with various embodiments.

Various embodiments may be implemented on a variety of network devices, an example of which is illustrated in FIG. 16 in the form of an Edge computing device 1600 functioning as a network element of a communication network, such as an Edge application server, an Edge enabler server, or an Edge data network configuration server. Such network computing devices may include at least the components illustrated in FIG. 16. With reference to FIGS. 1-16, the Edge computing device 1600 may typically include a processor 1601 coupled to volatile memory 1602 and a large capacity nonvolatile memory, such as a disk drive 1603. The Edge computing device 1600 may also include a peripheral memory access device such as a floppy disc drive, compact disc (CD) or digital video disc (DVD) drive 1606 coupled to the processor 1601. The Edge computing device 1600 may also include network access ports 1604 (or interfaces) coupled to the processor 1601 for establishing data connections with a network, such as the Internet and/or a local area network coupled to other system computers and servers. The Edge computing device 1600 may include one or more antennas 1607 for sending and receiving electromagnetic radiation that may be connected to a wireless communication link. The Edge computing device 1600 may include additional access ports, such as USB, Firewire, Thunderbolt, and the like for coupling to peripherals, external memory, or other devices.

Figure 17:
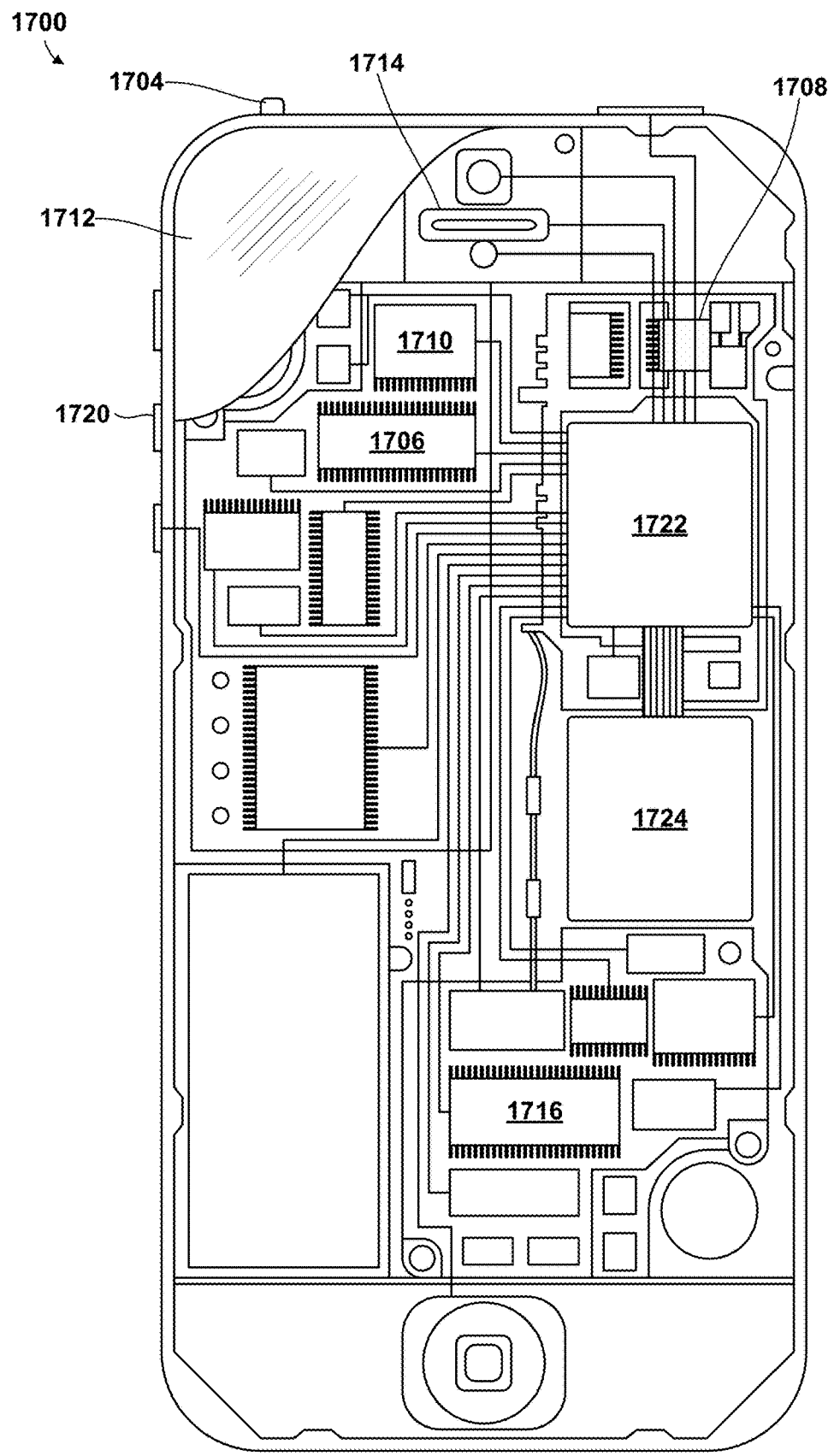
FIG. 17 is a component block diagram of a mobile device suitable for use with various embodiments.

In addition to the vehicle systems described with reference to FIGS. 1B-2B, various embodiments may be implemented on a variety of mobile devices (e.g., the mobile devices 120a-120e), an example of which is illustrated in FIG. 17 in the form of a smartphone 1700. The smartphone 1700 may include a first SOC 1722 (e.g., a SOC-CPU) coupled to a second SOC 1724 (e.g., a 5G capable SOC). The first and second SOCs 1722, 1724 may be coupled to internal memory 1706, 1716, a display 1712, and to a speaker 1714. Additionally, the smartphone 1700 may include an antenna 1704 for sending and receiving electromagnetic radiation that may be connected to a wireless data link and/or cellular telephone transceiver 1708 coupled to one or more processors in the first and/or second SOCs 1722, 1724. Smartphones 1700 typically also include menu selection buttons or rocker switches 1720 for receiving user inputs.

A typical smartphone 1700 also includes a sound encoding/decoding (CODEC) circuit 1710, which digitizes sound received from a microphone into data packets suitable for wireless transmission and decodes received sound data packets to generate analog signals that are provided to the speaker to generate sound. Also, one or more of the processors in the first and second SOCs 1722, 1724, wireless transceiver 1708, and CODEC 1710 may include a digital signal processor (DSP) circuit (not shown separately).

The processors of the Edge computing device 1600 and the smart phone 1700 may be any programmable microprocessor, microcomputer or multiple processor chip or chips that can be configured by software instructions (applications) to perform a variety of functions, including the functions of the various embodiments described below. In some mobile devices, multiple processors may be provided, such as one processor within an SOC 204 dedicated to wireless communication functions and one processor within an SOC 202 dedicated to running other applications. Typically, software applications may be stored in the memory 1706, 1716 before they are accessed and loaded into the processor. The processors may include internal memory sufficient to store the application software instructions.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020TM), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 600, 800, 1300, 1400, and 1500 may be substituted for or combined with one or more operations of the methods 600, 800, 1300, 1400, and 1500.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed by an Edge computing device for generating local dynamic map (LDM) data, comprising:
receiving first LDM data for a service area of the Edge computing device, wherein the Edge computing device is deployed for the service area to supplement processing capabilities of a mobile device for which the service area is relevant, wherein the Edge computing device receives the first LDM data from a set of devices including a road side unit (RSU), and wherein the first LDM data comprises highly dynamic data obtained within a threshold amount of time;
determining a trust metric for the received first LDM data based on one or more of a plurality of trust parameters corresponding to a source device of the set of devices, wherein the plurality of trust parameters include at least one of:
a first trust parameter based on whether the received first LDM data is corroborated with LDM data of the service area within the threshold amount of time from another source from the set of devices;
a second trust parameter based on one or more factors related to a communication link used to receive the first LDM data;
a third trust parameters based on whether the first LDM data is received from an authenticated source of the set of devices;
a fourth trust parameter based on a type and robustness of authentication credentials for a source device of the set of devices;
a fifth trust parameter based on whether the first LDM data is received from the source device that is registered with a network; or
a sixth trust parameter based on whether the source device is registered with the Edge computing device;
integrating the first LDM data into an LDM data model at the Edge computing device in response to determining that the trust metric exceeds a trust metric threshold;
receiving by the Edge computing device information regarding a planned route of the mobile device;
determining second LDM data of the LDM data model that is relevant to the mobile device based upon generated state information of the mobile device, wherein the determined second LDM data comprises highly dynamic data obtained within the threshold amount of time, wherein determining the second LDM data that is relevant to the mobile device includes determining the second LDM data that is relevant to the mobile device along the planned route, wherein determining the second LDM data that is relevant to the mobile device includes determining the second LDM data is beyond sensors of the mobile device and within a predetermined distance of the mobile device;
transmitting the determined second LDM data to the mobile device;
comparing the state information for the mobile device against the second LDM data to generate difference data; and
transmitting the difference data between the state information for the mobile device and the second LDM data to update LDM data on the mobile device.

2. The method of claim 1, wherein the LDM data model is maintained in the Edge computing device and includes LDM data of the service area of the Edge computing device.

3. The method of claim 1, wherein the mobile device is a computing device in a vehicle and providing determined second LDM data to the mobile device comprises:
generating a vehicle-specific digital map encompassing an area within the predetermined distance of the vehicle; and
transmitting the digital map to the vehicle, wherein the digital map is generated and transmitted in a format suitable for use in autonomous navigation of the vehicle.

4. The method of claim 1, further comprising receiving a registration message from the mobile device,
wherein determining the second LDM data that is relevant to a mobile device based upon generated state information of the mobile device comprises determining the second LDM data that is relevant to a mobile device further based on information included with the registration message.

5. The method of claim 1, wherein receiving first LDM data for a service area of the Edge computing device comprises:
receiving data from the mobile device, wherein the received data includes one or more of sensor data, image data, audio data, or operating state data obtained by the mobile device; and
determining, from the received data, information that should be integrated into the LDM data model.

6. The method of claim 1, wherein the first LDM data comprises data that is Type 4 highly dynamic information.

7. The method of claim 1, wherein the determined second LDM data comprises Type 4 highly dynamic LDM information.

8. The method of claim 1, wherein the first data is received via an Edge network interface.

9. The method of claim 1, further comprising:
receiving an LDM data query,
wherein determining the second LDM data that is relevant to the mobile device based upon generated state information of the mobile device comprises determining the second LDM data that is relevant to a mobile device further based on the received LDM data query.

10. The method of claim 1, wherein determining a trust metric for the received first LDM data based on whether the received first LDM data is corroborated with LDM data of the service area within the threshold amount of time from another source comprises determining the trust metric for the received first LDM data based on one or more additional trust parameters.

11. A computing device configured for use as an Edge computing device, comprising:
a processor configured with processor-executable instructions to perform operations comprising:
receiving first local dynamic map (LDM) data for a service area of the computing device, wherein the first LDM data comprises highly dynamic data obtained within a threshold amount of time, wherein the computing device is deployed for the service area to supplement processing capabilities of a mobile device, and wherein the computing device receives the first LDM data from a set of devices including a road side unit (RSU);
determining a trust metric for the received first LDM data based on one or more of a plurality of trust parameters corresponding to a source device of the set of devices, wherein the plurality of trust parameters:
a first trust parameter based on whether the received first LDM data is corroborated with LDM data of the service area within the threshold amount of time from another source from the set of devices;

a second trust parameter based on one or more factors related to a communication link used to receive the first LDM data;

a third trust parameters based on whether the first LDM data is received from an authenticated source of the set of devices;

a fourth trust parameter based on a type and robustness of authentication credentials for a source device of the set of devices;

a fifth trust parameter based on whether the first LDM data is received from the source device that is registered with a network; or a sixth trust parameter based on whether the source device is registered with the computing device;

integrating the first LDM data into an LDM data model at the computing device in response to determining that the trust metric exceeds a trust metric threshold;

receiving by the computing device information regarding a planned route of the mobile device;

determining second LDM data of the LDM data model that is relevant to the mobile device based upon generated state information of the mobile device, wherein the determined second LDM data comprises highly dynamic data obtained within the threshold amount of time, wherein determining the second LDM data that is relevant to the mobile device includes determining the second LDM data that is relevant to the mobile device along the planned route, wherein determining the second LDM data that is relevant to the mobile device includes determining the second LDM data is beyond sensors of the mobile device and within a predetermined distance of the mobile device;

transmitting the determined second LDM data to the mobile device;

comparing the state information for the mobile device against the second LDM data to generate difference data; and transmitting difference data between the state information for the mobile device and the second LDM data to update LDM data on the mobile device.

12. The computing device of claim 11, wherein the mobile device is a computing device in a vehicle, and wherein the processor is configured with processor-executable instructions to perform operations such that providing the determined second LDM data to the mobile device comprises:

generating a vehicle-specific digital map encompassing an area within the predetermined distance of the vehicle; and transmitting the digital map to the vehicle, wherein the digital map is generated and transmitted in a format suitable for use in autonomous navigation of the vehicle.

13. The computing device of claim 11, wherein the processor is configured with processor-executable instructions to perform operations further comprising receiving a registration message from the mobile device, and wherein the processor is configured with processor-executable instructions to perform operations such that determining the second LDM data that is relevant to the mobile device based upon generated state information of the mobile device comprises determining the second LDM data that is relevant to the mobile device further based on information included with the registration message.

14. The computing device of claim 11, wherein the processor is configured with processor-executable instructions to perform operations such that receiving first LDM data for a service area of the computing device comprises:

receiving data from the mobile device, wherein the received data includes one or more of sensor data, image data, audio data, or operating state data obtained by the mobile device; and determining, from the received data, information that should be integrated into the LDM data model.

15. The computing device of claim 11, wherein the processor is configured with processor-executable instructions to perform operations such that receiving first LDM data comprises receiving data that is Type 4 highly dynamic information.

16. The computing device of claim 11, further comprising:

receiving an LDM data query;

wherein determining the second LDM data that is relevant to the mobile device based upon generated state information of the mobile device comprises determining the second LDM data that is relevant to the mobile device further based the received LDM data query.

17. The computing device of claim 11, wherein determining a trust metric for the received first LDM data based on whether the received first LDM data is corroborated with LDM data from another source comprises determining the trust metric for the received first LDM data based on one or more additional trust parameters.

18. A non-transitory processor-readable medium having stored thereon processor-executable instruction configured to cause a processor of an Edge computing device to perform operations comprising:

receiving first local dynamic map (LDM) data for a service area of the computing device, wherein the first LDM data comprises highly dynamic data obtained within a threshold amount of time, wherein the Edge computing device is deployed for the service area to supplement processing capabilities of a mobile device, and wherein the Edge computing device receives the first LDM data from a set of devices including a road side unit (RSU);

determining a trust metric for the received first LDM data based on one or more of a plurality of trust parameters corresponding to a source device of the set of devices, wherein the plurality of trust parameters include at least one of:

a first trust parameter based on whether the received first LDM data is corroborated with LDM data of the service area within the threshold amount of time from another source from the set of devices;

a second trust parameter based on one or more factors related to a communication link used to receive the first LDM data;

a third trust parameters based on whether the first LDM data is received from an authenticated source of the set of devices;

a fourth trust parameter based on a type and robustness of authentication credentials for a source device of the set of devices;

a fifth trust parameter based on whether the first LDM data is received from the source device that is registered with a network; or a sixth trust parameter based on whether the source device is registered with the Edge computing device;

integrating the first LDM data into an LDM data model at the Edge computing device in response to determining that the trust metric exceeds a trust metric threshold;

receiving by the Edge computing device information regarding a planned route of the mobile device;

determining second LDM data of the LDM data model that is relevant to the mobile device based upon generated state information of the mobile device, wherein the determined second LDM data comprises highly dynamic data obtained within the threshold amount of time, wherein determining the second LDM data that is relevant to a mobile device includes determining the second LDM data that is relevant to the mobile device along the planned route, wherein determining the second LDM data that is relevant to the mobile device includes determining the second LDM data is beyond sensors of the mobile device and within a predetermined distance of the mobile device;

transmitting the determined second LDM data to the mobile device;

comparing the state information for the mobile device against the second LDM data to generate difference data; and transmitting difference data between the state information for the mobile device and the second LDM data used to update LDM data on the mobile device.

19. A computing device configured for use as an Edge computing device, comprising:

means for means for receiving first local dynamic map (LDM) data for a service area of the computing device, wherein the first LDM data comprises highly dynamic data obtained within a threshold amount of time, wherein the computing device is deployed about the service area to supplement processing capabilities of a mobile device, and wherein the computing device receives the first LDM data from a set of devices including a road side unit (RSU);

means for determining a trust metric for the received first LDM data based on one or more of a plurality of trust parameters corresponding to a source device of the set of devices, wherein the plurality of trust parameters include at least one of:

a first trust parameter based on whether the received first LDM data is corroborated with LDM data of the service area within the threshold amount of time from another source from the set of devices;

a second trust parameter based on one or more factors related to a communication link used to receive the first LDM data;

a third trust parameters based on whether the first LDM data is received from an authenticated source of the set of devices;

a fourth trust parameter based on a type and robustness of authentication credentials for a source device of the set of devices;

a fifth trust parameter based on whether the first LDM data is received from the source device that is registered with a network; or a sixth trust parameter based on whether the source device is registered with the computing device;

means for integrating the first LDM data into an LDM data model in response to determining that the trust metric exceeds a trust metric threshold;

means for receiving, at the computing device, information regarding a planned route of the mobile device;

means for determining second LDM data of the LDM data model that is relevant to the mobile device based upon generated state information of the mobile device, wherein the determined second LDM data comprises highly dynamic data obtained within the threshold amount of time, wherein determining the second LDM data that is relevant to a mobile device includes determining the second LDM data that is relevant to the mobile device along the planned route, wherein determining the second LDM data that is relevant to the mobile device includes determining the second LDM data is beyond sensors of the mobile device and within a predetermined distance of the mobile device;

means for transmitting the determined second LDM data to the mobile device;

means for comparing the state information for the mobile device against the second LDM data to generate difference data; and means for transmitting difference data between the state information for the mobile device and the second LDM data used to update LDM data on the mobile device.

\* \* \* \* \*